(12) United States Patent
Yamada

(10) Patent No.: US 7,965,652 B2
(45) Date of Patent: Jun. 21, 2011

(54) RADIO COMMUNICATION SYSTEM, LEAST SIGNIFICANT STATION, AND INTERMEDIATE STATION

(75) Inventor: Takefumi Yamada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 160 days.

(21) Appl. No.: 12/521,887

(22) PCT Filed: Feb. 4, 2008

(86) PCT No.: PCT/JP2008/051760
§ 371 (c)(1),
(2), (4) Date: Jul. 1, 2009

(87) PCT Pub. No.: WO2008/096705
PCT Pub. Date: Aug. 14, 2008

(65) Prior Publication Data
US 2010/0085882 A1     Apr. 8, 2010

(30) Foreign Application Priority Data

Feb. 8, 2007 (JP) .................................. 2007-029659

(51) Int. Cl.
*G01R 31/08* (2006.01)

(52) U.S. Cl. ...................... 370/252; 370/329; 455/67.11; 455/450; 725/81

(58) Field of Classification Search .................. 370/252, 370/329, 336; 455/67.11, 450, 266, 423, 455/7; 710/36; 386/291; 725/81, 62
See application file for complete search history.

(56) References Cited

U.S. PATENT DOCUMENTS

| | | | | |
|---|---|---|---|---|
| 6,879,826 B2 * | 4/2005 | Muramatsu | .................... | 455/423 |
| 7,031,654 B2 * | 4/2006 | Yamaguchi | ....................... | 455/7 |
| 7,512,314 B2 * | 3/2009 | Ikegami et al. | ............... | 386/291 |
| 2002/0177414 A1 * | 11/2002 | Shimada et al. | ............. | 455/67.1 |
| 2004/0157562 A1 * | 8/2004 | Ovaskainen et al. | ...... | 455/67.11 |
| 2005/0149649 A1 * | 7/2005 | Carneal et al. | .................. | 710/36 |
| 2005/0288030 A1 * | 12/2005 | Choi et al. | ..................... | 455/450 |
| 2007/0054645 A1 * | 3/2007 | Pan | ............................... | 455/266 |

(Continued)

FOREIGN PATENT DOCUMENTS

JP        3 250821        11/1991

(Continued)

OTHER PUBLICATIONS

Xing, Yiping et al., "Dynamic Spectrum Access in Open Spectrum Wireless Networks", IEEE Journal on Selected Areas in Communications, vol. 24, No. 3, pp. 626-637, (2006).

(Continued)

*Primary Examiner* — Aung S Moe
*Assistant Examiner* — Vinncelas Louis
(74) *Attorney, Agent, or Firm* — Oblon, Spivak, McClelland, Maier & Neustadt, L.L.P.

(57) ABSTRACT

In a lower-level station (1), as a configuration to determine a channel utilization probability, which is a probability based on which the relevant lower-level station (1) determines whether a channel determination operation is stared or not, a correction unit (16B) is newly provided, which corrects the channel utilization probability based on not only information on a number of lower-level stations which have performed communication during a predetermined period and channel utilization state recording information which indicates the channel utilization state of the lower-level stations which have performed the communication, but also information on all the communication channels that can be utilized, that is, information on channel capacity that can be utilized in the entire system.

12 Claims, 12 Drawing Sheets

U.S. PATENT DOCUMENTS

| | | | |
|---|---|---|---|
| 2007/0230395 A1* | 10/2007 | Guo et al. | 370/329 |
| 2009/0052407 A1* | 2/2009 | Motegi et al. | 370/336 |
| 2010/0069080 A1* | 3/2010 | Benveniste | 455/450 |
| 2010/0087150 A1* | 4/2010 | Yamada et al. | 455/67.11 |

FOREIGN PATENT DOCUMENTS

| | | |
|---|---|---|
| JP | 9 182141 | 7/1997 |
| JP | 11 205847 | 7/1999 |
| JP | 2001 128244 | 5/2001 |
| JP | 2001 298400 | 10/2001 |
| JP | 2002 51006 | 2/2002 |
| JP | 2004 349883 | 12/2004 |
| JP | 2005 102225 | 4/2005 |
| JP | 2006 303779 | 11/2006 |
| JP | 2007-037135 | 2/2007 |

OTHER PUBLICATIONS

Gintis, H. et al., "Game theory evolving: A problem-centered introduction to modeling strategic behavior", Prinston Univ. Press, pp. 258-261, (2000).

Notice of Allowance (with English translation) issued on Mar. 15, 2011, in counterpart Japanese Patent Application No. 2008-557099 (2 pages).

* cited by examiner

RADIO COMMUNICATION SYSTEM, LEAST SIGNIFICANT STATION, AND INTERMEDIATE STATION

TECHNICAL FIELD

The present invention relates to a radio communication system which includes an upper-level station, a plurality of middle-level stations and a plurality of lower-level stations, and in which the plurality of middle-level stations and lower-level stations share communication channels, and the present invention relates to a lower-level station and a middle-level station constituting the radio communication system.

BACKGROUND ART

Recently as radio communication technology advances and demands for radio communication technology expand, means of effectively utilizing frequency resources and flexibly allocating frequencies are demanded. A possible means of implementing flexible frequency allocation is providing an environment where a frequency band utilized for communication is shared by a plurality of mobile stations. In such an environment, methods for controlling frequency allocation, considering the impartiality in unit of mobile station, has been developed, and are utilized for wireless LAN systems which are operated in radio frequency bands for industry, science and medicine, for example.

Targeting such an environment where a plurality of mobile stations share communication channels, a method for controlling the utilization probability of communication channels, so that the gain of each mobile station is allocated fairly is stated in Non-patent Document 1, for example.

Non-patent Document 1: Y. Xing, R. Chandramouli, S. Mangold, S. Shankar: "Dynamic Spectrum Access in Open Spectrum Wireless Networks", IEEE Journal on Selected Areas in Communications (JSAC), Vol. 24, No. 3, pp. 626 to 637, March 2006

Non-patent Document 2: H. Gintis, "Game Theory Evolving: A problem-centered introduction to modeling strategic behavior", Princeton University Press, 2000

DISCLOSURE OF THE INVENTION

Problem to be Solved by the Invention

In a communication environment in which a plurality of mobile stations share communication channels, an appropriate channel utilization probability control method, to allocate communication channel impartially, is required, since the interest of each mobile station conflicts. The control policy utilized for prior art only equalizes the gain of each mobile station. In other words, an absolute value of gain which all mobile stations acquire is not considered, and if a mobile station spontaneously abandons acquiring gain, such as stopping transmission for any reason, for example, then the gain of other mobile stations are also restricted in order to ensure impartiality. Because of this, at the worst, it is possible that the gains of all mobile stations are equalized to zero. In such an environment, even if an impartial communication environment is ensured among the mobile stations, it does not really mean that a good communication environment is ensured in terms of overall efficiency.

With the foregoing in view, it is an object of the present invention to allocate gains impartially among lower-level stations, such as mobile stations, and at the same time, preventing unnecessary drops in gains of the lower-level stations, whereby the gains of all the lower-level stations are maximized.

Means for Solving the Problem

In order to achieve the above object, a radio communication system of the present invention is a radio communication system, comprising an upper-level station, a plurality of middle-level stations and a plurality of lower-level stations, in which a unique lower-level station ID is assigned to each lower-level station, and a signal including information on the lower-level station ID can be transmitted/received between the lower-level stations, wherein the upper-level station is configured to notify the middle-level station of information on all the communication channels that can be utilized under the middle-level station, the middle-level station is configured to notify the lower-level station of the information on all the communication channels that can be utilized, the lower-level station comprises: a decoding unit for receiving and decoding a signal which is transmitted from another lower-level station to acquire a received signal; a lower-level station ID detection unit for detecting a lower-level station ID of the other lower-level station from the received signal acquired by the decoding unit; an index generation unit for generating channel utilization state index information which indicates a channel utilization state to be measured; a measurement unit for measuring a channel utilization state indicated in the channel utilization state index information generated by the index generation unit, based on the received signal; a recording unit for coupling and recording the lower-level station ID of the other lower-level station detected by the lower-level station ID detection unit and the channel utilization state of the other lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication; an update amount calculation unit for calculating an update amount of a channel utilization probability which indicates a probability that the relevant lower-level station can utilize the channel, based on the lower-level station count information and channel utilization state recording information which are output from the recording unit and predetermined reaction coefficient information; a utilization probability update unit for updating the channel utilization probability based on the lower-level station count information, the channel utilization state recording information, the information on all the communication channels that can be utilized which is notified by the middle-level station, and the update amount calculated by the update amount calculation unit; a channel determination unit for determining, at a timing according to the channel utilization probability after update by the utilization probability update unit, a current channel state based on the received signal, and for determining a communication channel to be utilized for communication of the relevant lower-level station based on the channel state; a transmission signal generation unit for generating a transmission signal based on lower-level station ID information of the relevant lower-level station, signal destination information which indicates a transmission destination and transmission data to be transmitted; and a transmission unit for transmitting the transmission signal generated by the transmission signal generation unit via the communication channel determined by the channel determination unit, and the utilization probability update unit comprises: an update unit for updating a channel utilization probability after the previous update, based on the update amount calculated by the update amount calculation unit; a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

A lower-level station of the present invention is a lower-level station, to which a unique lower-level station ID is assigned and which can transmit/receive a signal including the lower-level station ID information to/from another lower-level station, comprising: a decoding unit for receiving and decoding a signal which is transmitted from another lower-level station to acquire a received signal; a lower-level station ID detection unit for detecting a lower-level station ID of the other lower-level station from the received signal acquired by the decoding unit; an index generation unit for generating channel utilization state index information which indicates a channel utilization state to be measured; a measurement unit for measuring a channel utilization state indicated in the channel utilization state index information generated by the index generation unit, based on the received signal; a recording unit for coupling and recording the lower-level station ID of the other lower-level station detected by the lower-level station ID detection unit and the channel utilization state of the other lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication; an update amount calculation unit for calculating an update amount of a channel utilization probability, which is a probability based on which the relevant lower-level station determines whether a channel determination operation is started or not, based on the lower-level station count information and channel utilization state recording information which are output from the recording unit and predetermined reaction coefficient information; a utilization probability update unit for updating the channel utilization probability based on the lower-level station count information, the channel utilization state recording information, the information on all the communication channels that can be utilized which is notified from the outside, and the update amount calculated by the update amount calculation unit; a channel determination unit for determining, at a timing according to the channel utilization probability after update by the utilization probability update unit, a current channel state based on the received signal, and for determining a communication channel to be utilized for communication of the relevant lower-level station based on the channel state; a transmission signal generation unit for generating a transmission signal based on lower-level station ID information of the relevant lower-level station, signal destination information which indicates a transmission destination, and transmission data to be transmitted; and a transmission unit for transmitting the transmission signal generated by the transmission signal generation unit via the communication channel determined by the channel determination unit, and wherein the utilization probability update unit comprises: an update unit for updating a channel utilization probability after the previous update, based on the update amount calculated by the update amount calculation unit; a correction unit for correcting the channel utilization probability updated by the update unit based on the lower-level station count information, the channel utilization state recording information and the information on all the communication channels that can be utilized; and an adjustment unit for adjusting the channel utilization probability after correction by the correction unit so that the channel utilization probability after the correction falls within a predetermined range.

According to the above invention, the channel utilization probability is corrected by the correction unit which is newly disposed in the lower-level station, based on the lower-level station count information, the channel utilization state recording information, and the information on all the communication channels that can be utilized, thereby, in a state where the channel capacity is not being utilized at the maximum, gains among the lower-level stations can be impartially allocated, and at the same time, an unnecessary drop of gains in the lower-level stations can be prevented, and the gains in all the lower-level stations can be maximized.

The correction unit may be newly disposed in a middle-level station, as described below, instead of being disposed in a lower-level station.

A radio communication system in this mode is a radio communication system comprising an upper-level station, a middle-level station, and a plurality of lower-level stations, in which a unique lower-level station ID is assigned to each lower-level station, and a signal including information on the lower-level station ID can be transmitted/received between the lower-level stations, wherein the upper-level station is configured to notify the middle-level station of information on all the communication channels that can be utilized under the middle-level station, the lower-level station comprises: a signal transmission request unit for transmitting signal transmission request information to the middle-level station, and for acquiring information on a communication channel to be utilized for communication of the relevant lower-level station from the middle-level station; a transmission signal generation unit for generating a transmission signal based on lower-level station ID information on the relevant lower-level station, signal destination information which indicates a transmission destination and transmission data to be transmitted; and a transmission unit for transmitting the transmission signal generated by the transmission signal generation unit via the communication channel indicated in the communication channel information acquired by the signal transmission request unit, the middle-level station comprises: a decoding unit for receiving and decoding a signal which is transmitted from the lower-level station to acquire a received signal; a lower-level station ID detection unit for detecting a lower-level station ID of the lower-level station from the received signal acquired by the decoding unit; an index generation unit for generating channel utilization state index information which indicates a channel utilization state to be measured; a measurement unit for measuring a channel utilization state indicated in the channel utilization state index information generated by the index generation unit, based on the received signal; a recording unit for coupling and recording the lower-level station ID of the lower-level station detected by the lower-level station ID detection unit and the channel utilization state of the lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication; an update amount calculation unit for calculating an update amount of a channel utilization probability, which is a probability based on which the relevant middle-level station determines whether a channel determination operation is started or not, based on the lower-level station count information and channel utilization state recording information which are output from the recording unit and predetermined reaction coefficient information; a utilization probability update unit for updating the channel utilization probability based on the lower-level station count information, the channel utilization state recording information, the information on all the communication channels that can be utilized which is notified from the upper-level station, and the update amount calculated by the update amount calculation unit; and a channel determination unit for determining, at a timing according to the channel utilization probability after update by the utilization probability update unit, a current channel state based on the received signal, for determining a communication channel to be utilized for communication of the lower-level station based on the channel state, and for notifying the communication channel information to the lower-level station, and the utilization probability update unit comprises: an update unit for updating a channel utilization probability after the previous update, based on the update amount calculated by the update amount calculation unit; a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

A middle-level station in the above mentioned mode is a middle-level station which replies, upon receiving signal transmission request information from a lower-level station, communication channel information to be utilized for communication of the lower-level station, to which a unique lower-level station ID is assigned and which transmits a signal including information on the lower-level station ID, comprising: a decoding unit for receiving and decoding a signal which is transmitted from the lower-level station to acquire a received signal; a lower-level station ID detection unit for detecting a lower-level station ID of the lower-level station from the received signal acquired by the decoding unit; an index generation unit for generating channel utilization state index information which indicates a channel utilization state to be measured; a measurement unit for measuring a channel utilization state indicated in the channel utilization state index information generated by the index generation unit, based on the received signal; a recording unit for coupling and recording the lower-level station ID of the lower-level station detected by the lower-level station ID detection unit and the channel utilization state of the lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication; an update amount calculation unit for calculating an update amount of a channel utilization probability, which is a probability based on which the relevant middle-level station determines whether a channel determination operation is started or not, based on the lower-level station count information and channel utilization state recording information which are output from the recording unit and predetermined reaction coefficient information; a utilization probability update unit for updating the channel utilization probability based on the lower-level station count information, the channel utilization state recording information, the information on all the communication channels that can be utilized which is notified from the outside, and the update amount calculated by the update amount calculation unit; and a channel determination unit for determining, at a timing according to the channel utilization probability after update by the utilization probability update unit, a current channel state based on the received signal, for determining a communication channel to be utilized for communication of the lower-level station based on the channel state, and for notifying the communication channel information to the lower-level station, and wherein the utilization probability update unit comprises: an update unit for updating a channel utilization probability after the previous update, based on the update amount calculated by the update amount calculation unit; a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

According to these aspects of the invention, the channel utilization probability is corrected by the correction unit which is newly disposed in the middle-level station, based on the lower-level station count information, the channel utilization state recording information, and the information on all the communication channels that can be utilized, thereby in a state where the channel capability is not being utilized at the maximum, the gains among the lower-level stations can be impartially allocated, and at the same time, an unnecessary drop of gains in the lower-level stations can be prevented, and the gain in all of the lower-level stations can be maximized.

In the lower-level station according to the present invention, it is preferable that the measurement unit is configured to further measure the collision state of transmission signals, and output the measurement result as channel collision state information, the recording unit is configured to further record and output the channel collision state information, and the correction unit is configured to correct the channel utilization probability updated by the update unit based on the lower-level station count information, the channel utilization state recording information, the information on all the communication channels that can be utilized, and the channel collision state information.

In the same way, in the middle-level station according to the present invention as well, it is preferable that the measurement unit is configured to further measure the collision state of transmission signals, and output the measurement result as channel collision state information, the recording unit is configured to further record and output the channel collision state information, and the correction unit is configured to correct the channel utilization probability updated by the update unit based on the lower-level station count information, the channel utilization state recording information, the information on all the communication channels that can be utilized, and the channel collision state information.

According to such a lower-level station or middle-level station, the channel utilization probability information can be controlled considering the collision state of signals, and more accurate channel utilization probability control can be implemented.

The index generation unit in the radio communication system according to the present invention may be configured to generate the channel utilization state index information which indicates a channel utilization time of the lower-level station as the channel utilization state to be measured.

As a modified form of the above aspects of the invention, the index generation unit may be configured to generate the channel utilization state index information which indicates a product of a channel utilization time of the lower-level station multiplied by a bandwidth in use of the lower-level station, as the channel utilization state to be measured. In this case, impartiality among each lower-level station can be ensured even in an environment where an infinite variety of combinations of the required communication time and bandwidth to be utilized exist, depending on the characteristics of the application utilized by each lower-level station.

Also as a modified form of the above aspects of the invention, the index generation unit may be configured to generate the channel utilization state index information which indicates a product of a value corresponding to a signal reaching range multiplied by a channel utilization time and a bandwidth in use of the lower-level station, as the channel utilization state to be measured. In this case, impartiality among each lower-level station can be ensured even in a communication environment where transmission output power is different in each lower-level station because a communication system utilized by each lower-level station is different, for example, and as a result, while a lower-level station having a relatively high transmission output power is transmitting signals, another lower-level station having a relatively low transmission output power cannot utilize the channel being utilized for this transmission throughout a relatively wide range.

EFFECTS OF THE INVENTION

According to the present invention, gains among the lower-level stations can be impartially allocated, and at the same time, an unnecessary drop of gains in the lower-level stations can be prevented, and the gains of all the lower-level stations can be maximized.

EXPLANATION OF REFERENCE SYMBOLS 1 is for lower-level station, 1S is for signal transmission request unit, 2 is for middle-level station, 3 is for upper-level station, 4 is for radio communication system, 10 is for decoding unit, 11 is for lower-level station ID detection unit, 12 is for measurement unit, 13 is for index generation unit, 14 is for recording unit, 15 is for update amount calculation unit, 16 is for utilization probability update unit, 16A is for addition unit, 16B is for correction unit, 16C is for adjustment unit, 17 is for channel determination unit, 18 and 18A are for transmission unit, 19 and 19A are for transmission signal generation unit, 20 is for decoding unit, 21 is for lower-level station ID detection unit, 22 is for measurement unit, 23 is for index generation unit, 24 is for recording unit, 25 is for update amount calculation unit, 26 is for utilization probability update unit, 26A is for addition unit, 26B is for correction unit, 26C is for adjustment unit, 27 is for channel determination unit, 28 is for area registration unit, 51 is for correction coefficient generation unit, 52 is for multiplier, 101 is for CPU, 102 is for main storage unit, 103 is for auxiliary storage unit, 104 is for communication control unit, 105 is for display unit, and 106 is for operation unit.

BEST MODE FOR CARRYING OUT THE INVENTION

First Embodiment

Figure 1:
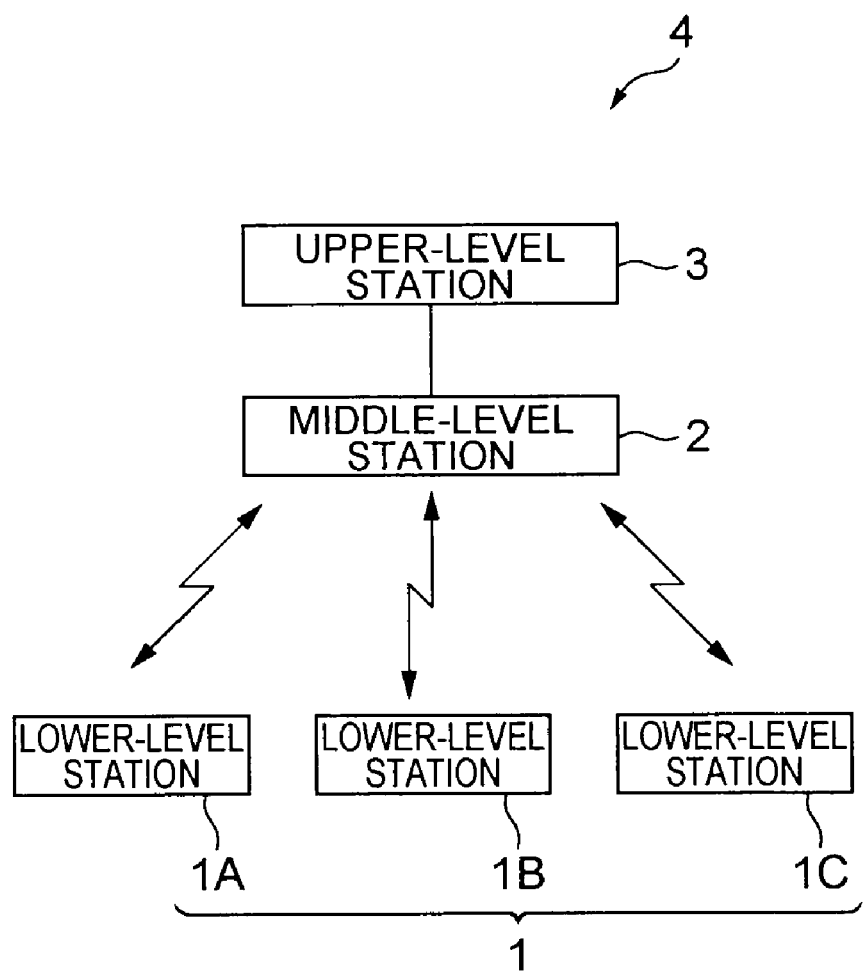
FIG. 1 is a block diagram depicting a radio communication system according to each embodiment.

As FIG. 1 shows, a radio communication system 4 according to the first embodiment is comprised of a plurality of lower-level stations 1A, 1B and 1C (hereafter generically called "lower-level station 1"), a middle-level station 2 which manages the area states of subordinate lower-level stations, and an upper-level station 3 which manages information on communication channels that can be utilized. The communication channel is called a "channel" herein below.

The upper-level station 3 has a function to notify information on all the channels that can be utilized (that is, information on channel capacity that can be utilized for all the lower-level stations) to the middle-level station 2. A unique lower-level station ID is assigned to the lower-level station 1, and the lower-level station 1 can transmit a signal including this lower-level station ID to the middle-level station 2 and other lower-level stations 1. The middle-level station 2 has a function to receive a data signal which is transmitted from a lower-level station 1, and perform area registration of this lower-level station 1 using the lower-level station ID information included in this data signal, and notify the completion of registration and information on all the channels that can be utilized by this lower-level station 1, to this lower-level station 1 after registration completes.

The first embodiment is an embodiment that correction unit 16B for correcting channel utilization probability in a lower-base station 1, based on lower-level station count information, channel utilization state recording information, and information on all the communication channels that can be utilized, is newly disposed in the lower-level station 1, thereby in a state where the channel capacity is not utilized at the maximum, the gains among the lower-level stations can be impartially allocated, and at the same time, an unnecessary drop of gains in the lower-level stations can be prevented, and the gains in all of the lower-level stations can be maximized. In the first embodiment, it is assumed that each lower-level station 1 exists under one middle-level station 2, and communicates sharing one communication channel, so as to simplify description.

Figure 2:
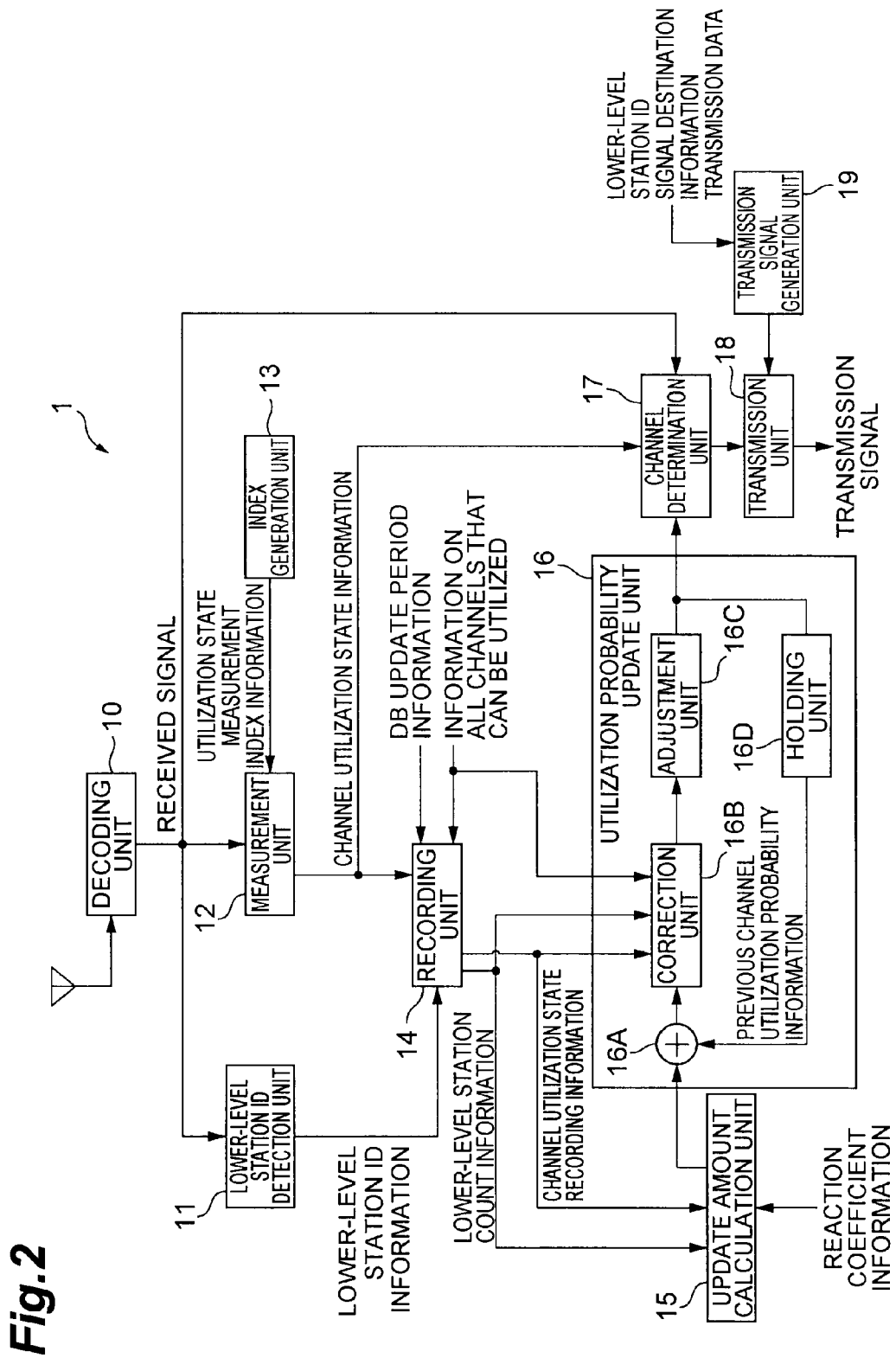
FIG. 2 is a block diagram depicting a lower-level station according to the first embodiment.

The configuration of the lower-level station 1 will now be described with reference to FIG. 2. As FIG. 2 shows, the lower-level station 1 has: a decoding unit 10 which acquires a received signal by receiving and decoding a signal transmitted by another lower-level station; a lower-level station ID detection unit 11 which detects a lower-level station ID of another lower-level station based on the received signal acquired by the decoding unit 10; an index generation unit 13 which generates channel utilization state index information which indicates a channel utilization state to be measured; a measurement unit 12 which measures the channel utilization state indicated in the channel utilization state index information generated by the index generation unit 13 based on the received signal; a recording unit 14 which associates and records a lower-level station ID of another lower-level station detected by the lower-level station ID detection unit 11 and channel utilization state of the other lower-level station measured by the measurement station 12, and outputs lower-level station count information which indicates a number of lower-level stations which have performed communication during a predetermined database update period and channel utilization state recording information which indicates the channel utilization state of the lower-level stations which have performed communication; an update amount calculation unit 15 which calculates an update amount of a channel utilization probability which indicates a probability that the lower-level station 1 can utilize the channel, based on the lower-level station count information and channel utilization state recording information which are output from the recording unit 14 and predetermined reaction coefficient information; a utilization probability update unit 16 which updates a channel utilization probability based on the lower-level station count information and channel utilization state recording information, information on all the communication channels that can be utilized, which is notified from the middle-level station, and update amount calculated by the update amount calculation unit 15; a channel determination unit 17 which determines, at a timing according to the channel utilization probability after update by the utilization probability update unit 16, the current channel state based on the received signal, and determines a communication channel to be utilized for communication of the lower-level station 1 based on the channel state; a transmission signal generation unit 19 which generates a transmission signal based on lower-level station ID information of the lower-level station 1, signal destination information which indicates a transmission destination and transmission data to be transmitted; and a transmission unit 18 which transmits a transmission signal generated by the transmission signal generation unit 19 via the communication channel determined by the channel determination unit 17.

Of these composing elements, the index generation unit 13 generates channel utilization state index information which indicates the "channel utilization time of the lower-level station" as the channel utilization state to be measured.

The update amount calculation unit 15 calculates the update amount of the channel utilization probability as follows, so that the degree of satisfaction among each lower-level station becomes impartial. In concrete terms, the channel utilization amount is defined as "gain", and the degree of satisfaction is expressed by a numerical value using the utility function, and a state when the value which indicates the degree of satisfaction is the same among the lower-level stations is defined as an "impartial state". Then the current degree of satisfaction in each lower-level station is calculated based on the channel utilization state information, and is compared. If it is estimated that a partial state is generated (that is, a predetermined amount or higher difference is generated among the degree of satisfaction of each lower-level station), the update amount with respect to the current channel utilization probability is calculated so as to dissolve this partial state, and the channel utilization probability update amount acquired by this calculation is output. This control can be implemented by using the following equation, for example.

The utility function of each lower-level station is given by the following Equation (1), where $x_i$ is a gain of the i-th lower-level station, $x_j$ is a gain of another lower-level station, and n is a number of lower-level stations.

[Equation 1]

$$U(x_i) = x_i - \frac{1}{n-1}\left[\left(\alpha_i \sum_{x_j > x_i} (x_j - x_{1,i}) + \beta_i \sum_{x_i > x_j} (x_i - x_j)\right)\right] \quad (1)$$

Here $\alpha_i$ is a predetermined reaction coefficient to a lower-level station of which gain is higher than the relevant lower-level station, and $\beta_i$ is a predetermined reaction coefficient to a lower-level station of which gain is lower than the relevant lower-level station. According to the Non-patent Document 2, it is experientially known that a stable system can be constructed by setting the reaction coefficients to be $\alpha_i > \beta_i > 0$.

Based on the above mentioned utility functions, the channel utilization probability update amount information $\Delta P_i$ is calculated using the following Equation (2).

[Equation 2]

$$\Delta P_i = \frac{\alpha_i}{n-1} \sum_{x_j > x_i} (x_j - x_i) - \frac{\beta_i}{n-1} \sum_{x_i > x_j} (x_i - x_j) \quad (2)$$

The channel utilization probability update amount information calculated by this update amount calculation unit 15 is input to the utilization probability update unit 16.

Now a configuration of the utilization probability update unit 16, which is a key component of the present invention, will be described.

As FIG. 2 shows, the utilization probability update unit 16 has: an addition unit 16A (update unit) which updates the channel utilization probability by adding the update amount calculated by the update amount calculation unit 15 and the channel utilization probability after previous update; a correction unit 16B which corrects the channel utilization probability updated by the addition unit 16A based on the lower-level station count information, channel utilization state recording information and information on all the communication channels that can be utilized; an adjustment unit 16C which adjusts the channel utilization probability after the correction so that the channel utilization probability after correction by the correction unit 16B falls within a predetermined range; and a holding unit 16D which holds (stores) the channel utilization probability information after adjustment, which is output from the adjustment unit 16C, and feeds the information back to the addition unit 16A.

Figure 3:
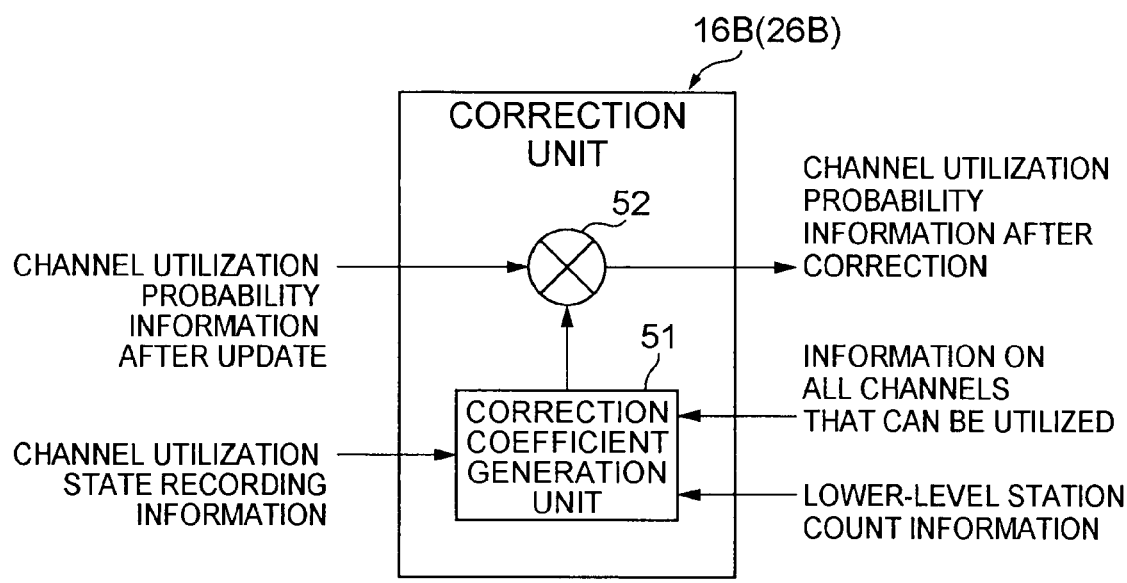
FIG. 3 is a block diagram depicting a correction unit according to the first and second embodiments.

Of these composing elements, the correction unit 16B has a function to verify whether the entire channel capacity is fully utilized, and corrects the channel utilization probability information updated by the addition unit 16A if not fully utilized. FIG. 3 shows a configuration example of the correction unit 16B.

The correction unit 16B has a correction coefficient generation unit 51 and a multiplier 52. The correction coefficient generation unit 51 outputs channel utilization probability correction coefficient information $C_{tx\_prob}$ using channel utilization state information $x_i$, lower-level station count information, and information on all the channels that can be utilized. In concrete terms, the channel utilization probability correction coefficient information $C_{tx\_prob}$ can be determined by the following Equation (3), where $Capa_{all}$ is information on all the channels that can be utilized.

[Equation 3]

$$C_{tx\_prob} = \frac{Capa_{all}}{\sum_i x_i} \quad (3)$$

Because of this, $C_{tx\_prob}=1$ is established if the channels are all utilized by any lower-level station, but if a channel which is not being utilized exists, $C_{tx\_prob}>1$ is established.

The multiplier 52 multiplies the above mentioned channel utilization probability correction coefficient information by channel utilization probability information $P_i$ (t), so as to correct the channel utilization probability information $P_i$ (t). The channel utilization probability information $P_i'$ (t) after correction is determined by the following Equation (4).

[Equation 4]

$$P_i'(t)=C_{tx\_prob}P_i(t) \quad (4)$$

Because of this, if the channels are all utilized by any lower-level station, $C_{tx\_prob}=1$ is established, and the channel utilization probability information $P_i'$ (t) after correction and the channel utilization probability information $P_i$ (t) become a same value, therefore correction is not actually performed.

If a channel which is not being utilized exists, on the other hand, $C_{tx\_prob}>1$ is established, so correction is performed so that the channel utilization probability information $P_i'$ (t) after correction becomes a value greater than the channel utilization probability information $P_i$ (t).

In the adjustment unit 16C, adjustment processing according to the following Equation (5) is performed, where $P_{Max}$ is the maximum value in the range of the size of the channel utilization probability information and $P_{Min}$ is the minimum value in the range of the size of the channel utilization probability information.

[Equation 5]

$$p_i(t)=\max(P_{Min},\min(P_{Max},(p_i(t-1)+\Delta P_i))) \quad (5)$$

Here, 'max' is an operation to select a maximum value and 'min' is an operation to select a minimum value, and both $P_{Max}$ and $P_{Min}$ are equal to or more than 0 and are equal to or less than 1. If a relationship of gain and channel utilization probability is known in advance, appropriate values can be calculated based on this relationship. In this way, a channel utilization probability information $P_i$ (t) in the next transmission can be derived.

Figure 11:
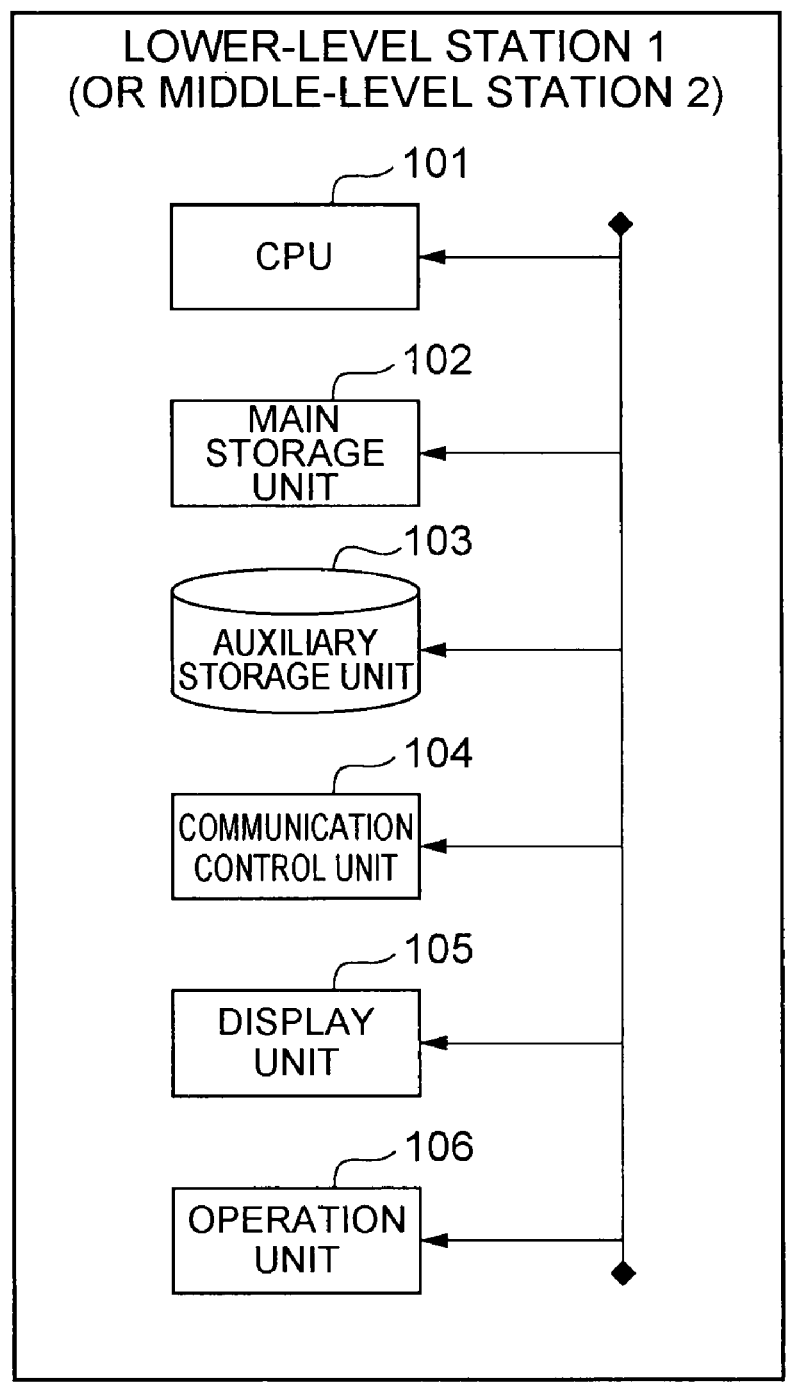
FIG. 11 is a block diagram depicting the hardware of the lower-level station or the middle-level station.

As FIG. 11 shows, the hardware of the lower-level station 1 having the above mentioned functions is comprised of, for example, a CPU 101 which executes the operating system and application programs, a main storage unit 102 such as ROM and RAM, an auxiliary storage unit 103 such as memory, a communication control unit 104 which controls communication in general, a display unit 105 such as a liquid crystal monitor, and an operation unit 106 having a keyboard to input characters and numbers and to instruct execution. Each function described with reference to FIG. 2 is implemented by having the CPU 101 and the main storage unit 102 shown in FIG. 11 read predetermined software, and by having the communication control unit 104 operate under control of the CPU 101, and also by having the main storage unit 102 and the auxiliary storage unit 103 read and write data.

[Operation in Radio Communication System of First Embodiment]

Operation in the radio communication system of the first embodiment will now be described with reference to FIG. 4.

Figure 4:
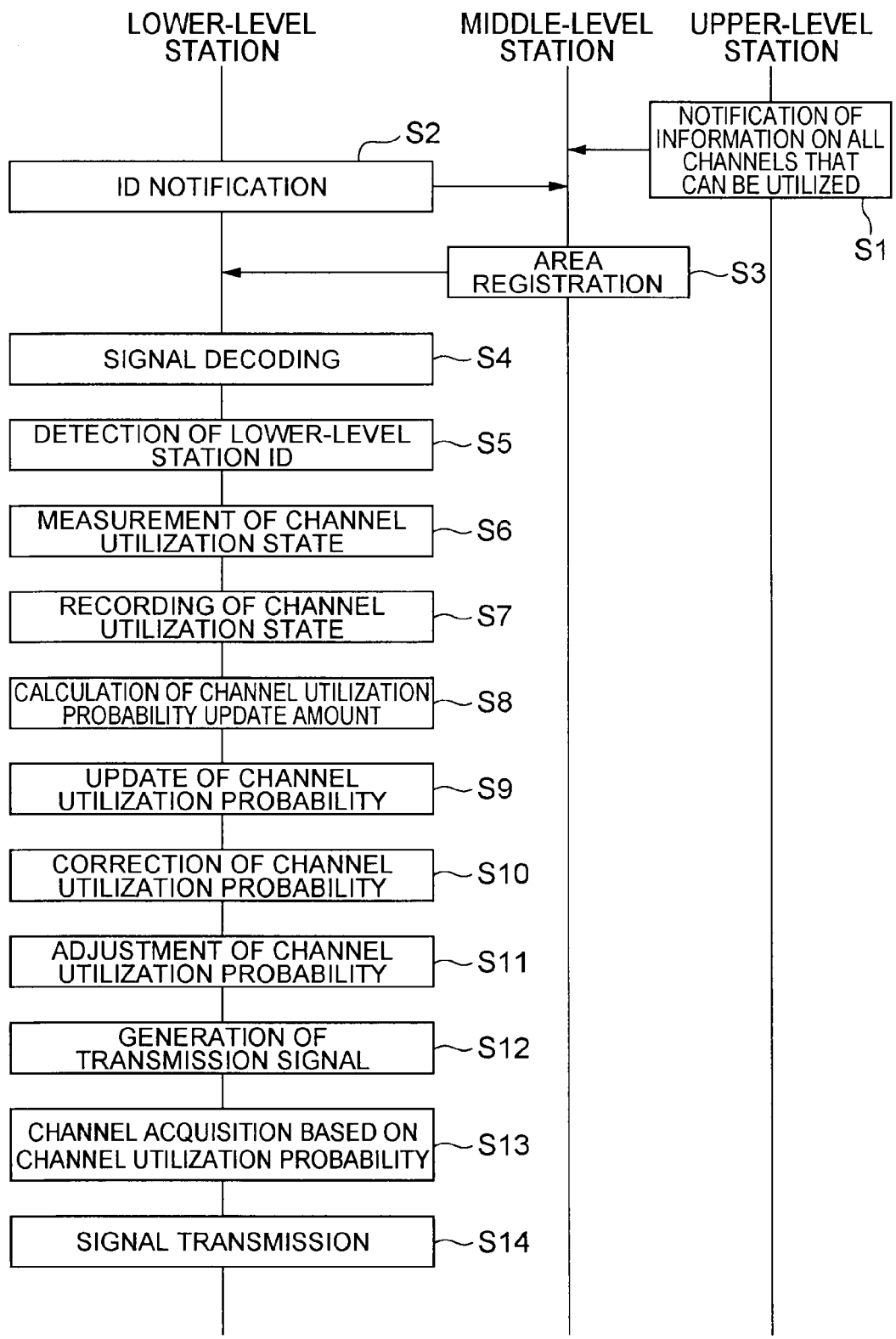
FIG. 4 is a flow chart depicting the operation in the radio communication system of the first embodiment.

An upper-level station 3 notifies information on all the channels that can be utilized under a middle-level station 2, to the middle-level station 2 in advance (step S1 in FIG. 4). A lower-level station 1 transmits lower-level station ID information which is unique to the lower-level station 1 to the middle-level station 2, in order to notify the existence of the lower-level station 1 to the middle-level station 2 (step S2). When the lower-level station ID information is received, the lower-level station 2 performs area registration of this lower-level station 1 based on the lower-level station ID information, and when the area registration completes, the middle-level station 2 notifies the registration completion notice and the above mentioned information on all the communication channels that can be utilized, to the lower-level station 1 (step S3). The information on all the communication channels that can be utilized, which is notified from the middle-level station 2 at this time, may be recorded in the recording unit 14 of the lower-level station 1.

In the lower-level station 1, the following processing is executed during standby. The decoding unit 10 acquires a received signal by receiving and decoding a signal transmitted from another lower-level station (signal including lower-level station ID information of this other lower-level station) (step S4). The lower-level station ID detection unit 11 detects the lower-level station ID of this other lower-level station from the received signal (step S5).

Then the index generation unit 13 generates channel utilization state index information which indicates channel utilization state to be measured, and the measurement unit 12 measures the channel utilization state indicated by this channel utilization state index information from the received signal (step S6). Here the index generation unit 13 can generate the channel utilization state index information which indicates the channel utilization time of the lower-level station, as the channel utilization state to be measured. The channel utilization state measured by the measurement unit 12 is output to the recording unit 14 and channel determination unit 17 as the channel utilization state information.

The recording unit 14 associates and records a lower-level station ID of another lower-level station detected by the lower-level station ID detection unit 11 and the channel utilization state of this other lower-level station measured by the measurement unit 12, and receives this data in the embedded database (step S7). The recording unit 14 periodically initializes the database using predetermined database update period information, or updates the database using the latest information from the previous database update period, and after the recording in step S7, the recording unit 14 outputs the lower-level station count information which indicates a number of lower-level stations which have performed communication during the database update period and the channel utilization state recording information which indicates the channel utilization state of the lower-level stations which have performed this communication, to the correction unit 16B.

The update amount calculation unit 15 calculates the update amount of the channel utilization probability, as described above, based on the lower-level station count information and channel utilization state recording information which are output from the recording unit 14, and the reaction coefficient information (step S8).

The utilization probability update unit 16 updates the channel utilization probability by using the addition unit 16A to add the update amount calculated by the update amount calculation unit 15 and the channel utilization probability after a previous update (step S9).

Then the correction unit 16B corrects the channel utilization probability updated by the addition unit 16A, as mentioned above, based on the lower-level station count information, channel utilization state recording information, and information on all the communication channels that can be utilized (step S10).

Then the adjustment unit 16C adjusts the channel utilization probability after correction by the correction unit 16B, as mentioned above, so that the channel utilization probability after the correction falls within a predetermined range (step S11).

In the lower-level station 1, the following processing is executed during transmission. The transmission signal generation unit 19 generates a transmission signal based on the lower-level station ID information of the lower-level station 1, signal destination information which indicates a transmission destination, and transmission data to be transmitted (step S12). Specifically, the transmission signal generation unit 19 generates a signal to be transmitted as a digital signal, and attaches the ID information of the middle-level station to be the destination of this signal and address information of the receiver (lower-level station at the destination) to this digital signal as the signal destination information. For the destination information, an IP address of the receiver, for example, can be utilized. Then the transmission signal generation unit 19 can generate the transmission signal by attaching the lower-level station ID information of the lower-level station, which is a transmission source.

The channel determination unit 17 starts operation to determine a channel to be utilized for communication of the lower-level station 1 at a timing according to the channel utilization probability after update by the utilization probability update unit 16 (step S13). The operation to determine a channel here corresponds to an operation to determine the current utilization state based on the channel utilization state information, and determine a channel based on this channel state. For example, in order to avoid collision with communication of another lower-level station, a signal in a channel is received and the reception intensity of this signal is measured, and it is judged whether the reception intensity is greater than a predetermined threshold, whereby it is judged whether another lower-level station utilizing this channel exists or not. In other words, if the reception intensity is greater than the predetermined threshold, it is judged that another lower-level station utilizing this channel exists, and if the reception intensity is less than the predetermined threshold, it is judged that another lower-level station utilizing this channel does not exist (this channel is not utilized). If it is judged that another lower-level station utilizing this channel does not exist (this channel is not utilized), the channel determination unit 17 determines to actually transmit the signal utilizing this channel. In this way a channel is determined.

The transmission unit 18 transmits the generated transmission signal utilizing this communication channel determined like this (step S14).

According to the first embodiment, the channel utilization probability is corrected by the correction 16B which is newly disposed in the lower-level station 1, based on the lower-level station count information, channel utilization state recording information, and information on all the communication channels that can be utilized, thereby in a state where the channel capacity is not being utilized at the maximum, the gains among the lower-level stations can be impartially allocated, and at the same time, an unnecessary drop of gains in the lower-level stations can be prevented, and the gain in all the lower-level stations can be maximized.

Second Embodiment

A second embodiment is an embodiment of newly disposing a correction unit 26B for correcting channel utilization probability in a middle-level station 2 based on lower-level station count information, channel utilization state recording information, and information on all the communication channels that can be utilized, thereby in a state where the channel capacity is not utilized at the maximum, gains among the lower-level stations can be impartially allocated, and at the same time, an unnecessary drop of gains in the lower-level stations can be prevented, and the gains in all of the lower-level stations can be maximized.

The configuration of the radio communication system 4 according to the second embodiment is the same as that of the first embodiment, therefore description on the configuration of the radio communication system 4 is omitted.

The configuration of the middle-level station 2, configuration of the lower-level station 1, and processing operation in the radio communication system 4 will now be described sequentially.

Figure 5:
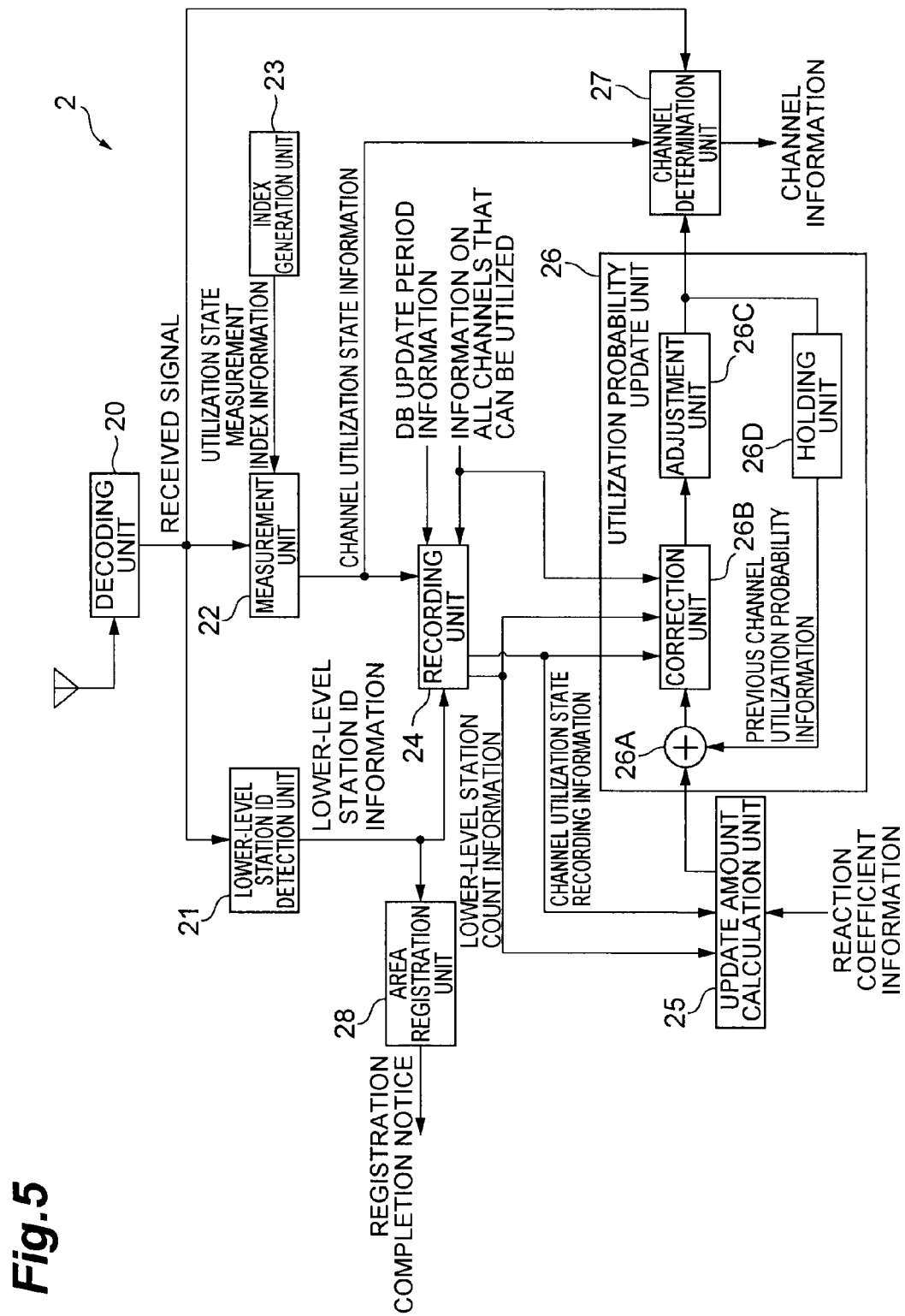
FIG. 5 is a block diagram depicting a middle-level station according to the second embodiment.

The configuration of the middle-level station 2 will be described first with reference to FIG. 5. As FIG. 5 shows, the middle-level station 2 has: a decoding unit 20 which acquires a received signal by receiving and decoding a signal which is transmitted from a lower-level station; a lower-level station ID detection unit 21 which detects a lower-level station ID of the lower-level station from the received signal acquired by the decoding unit 20; an area registration unit 28 which performs area registration of the lower-level station based on the lower-level station ID information of the lower-level station detected by the lower-level station ID detection unit 21 and notifies the registration completion notice to this lower-level station after the area registration completes; an index generation unit 23 which generates channel utilization state index information which indicates a channel utilization state to be measured; a measurement unit 22 which measures a channel utilization state indicated in the channel utilization state index information generated by the index generation unit 23 based on the received signal; a recording unit 24 which associates and records the lower-level station ID of the lower-level station detected by the lower-level station ID detection unit 21 and the channel utilization state of the lower-level station measured by the measurement unit 22, and outputs lower-level station count information which indicates a number of lower-level stations which have performed communication during a predetermined database update period and channel utilization state recording information which indicates the channel utilization state of the lower-level stations which have performed communication; an update amount calculation unit 25 which calculates an update amount of a channel utilization probability, which is a probability based on which the middle-level station determines whether a channel determination operation is started or not, based on the lower-level station count information and channel utilization state recording information which are output from the recording unit 24 and predetermined reaction coefficient information; a utilization probability update unit 26 which updates the channel utilization probability based on the lower-level station count information, channel utilization state recording information, information on all the communication channels that can be utilized which is notified from the upper-level station, and the update amount calculated by the update amount calculation unit 25; and a channel determination unit 27 which determines, at a timing according to the channel utilization probability after update by the utilization probability update unit 26, the current channel state based on the received signal, determines a communication channel to be utilized for communication of the lower-level station based on the channel state, and notifies the communication channel information to the lower-level station.

Of these composing elements, the index generation unit 23 generates channel utilization state index information which indicates "channel utilization time of the lower-level station" as the channel utilization state to be measured.

The update amount calculation unit 25 calculates the update amount of the channel utilization probability as follows, so that the degree of satisfaction among each lower-level station becomes impartial. In concrete terms, the channel utilization amount is defined as a "gain", and the degree of satisfaction is expressed by a numerical value using the utility function, and a state when the value which indicates the degree of satisfaction is the same among the lower-level station is defined as an "impartial state". Then the current degree of satisfaction in each lower-level station is calculated based on the channel utilization state information, and is compared. If it is estimated that a partial state occurs (that is, a predetermined amount or higher difference occurs among the degree of satisfaction of each lower-level station), the update amount with respect to the current channel utilization probability is calculated so as to dissolve this partial state, and the channel utilization probability update amount information acquired by this calculation is output. This control can be implemented by using the following equation, for example.

The utility function of each lower-level station is given by the following Equation (6), where $x_i$ is a gain of the i-th lower-level station, $x_j$ is a gain of another lower-level station, and n is a number of lower-level stations.

[Equation 6]

$$U(x_i) = x_i - \frac{1}{n-1}\left[\left(\alpha \sum_{x_j > x_i}(x_j - x_{1,i}) + \beta_i \sum_{x_i > x_j}(x_i - x_j)\right)\right] \quad (6)$$

Here $\alpha_i$ is a predetermined reaction coefficient to a lower-level station of which gain is higher than the relevant lower-level station, and $\beta_i$ is a predetermined reaction coefficient to a lower-level station of which gain is lower than the relevant lower-level station. According to Non-patent Document 2, it is experientially known that a stable system can be constructed by setting the reaction coefficients to be $\alpha_i > \beta_i > 0$.

Based on the above mentioned utility functions, the channel utilization probability update amount information $\Delta P_i$ is calculated using the following Equation (7).

[Equation 7]

$$\Delta P_i = \frac{\alpha_i}{n-1}\sum_{x_j > x_i}(x_j - x_i) - \frac{\beta_i}{n-1}\sum_{x_i > x_j}(x_i - x_j) \quad (7)$$

The channel utilization probability update amount information calculated by this update amount calculation unit 25 is input to the utilization probability update unit 26.

Now a configuration of the utilization probability update unit 26, which is a key component of the present invention, will be described.

As FIG. 5 shows, the utilization probability update unit 26 has: an addition unit 26A (update unit) which updates the channel utilization probability by adding the update amount calculated by the update amount calculation unit 25 and the channel utilization probability after a previous update; a correction unit 26B which corrects the channel utilization probability updated by the addition unit 26A based on the lower-level station count information, channel utilization state recording information, and information on all the communication channels that can be utilized; an adjustment unit 26C which adjusts the channel utilization probability after the correction so that the channel utilization probability after correction by the correction unit 26B falls within a predetermined range; and a holding unit 26D which holds (stores) the channel utilization probability information after adjustment, which is output from the adjustment unit 26C, and feeds the information back to the addition unit 26A.

Of these composing elements, the correction unit 26B has a function to verify whether the entire channel capacity is fully utilized, and corrects the channel utilization probability information updated by the addition unit 26A if not fully utilized. The configuration of the correction unit 26B is the same as that of the correction unit 16B of the first embodiment shown in FIG. 3.

The correction unit 26B has a correction coefficient generation unit 51 and a multiplier 52. The correction coefficient generation unit 51 outputs channel utilization probability correction coefficient information $C_{tx\_prob}$ using channel utilization state information $x_i$, lower-level station count information, and information on all the channels that can be utilized. In concrete terms, the channel utilization probability correction coefficient information $C_{tx\_prob}$ can be determined by the following Equation (8), where $Capa_{all}$ is information on all the channels that can be utilized.

[Equation 8]

$$C_{tx\_prob} = \frac{Capa_{all}}{\sum_i x_i} \quad (8)$$

Because of this, if the channels are all utilized by any lower-level station, $C_{tx\_prob}=1$ is established, but if a channel which is not utilized exists, $C_{tx\_prob}>1$ is established.

The multiplier 52 multiplies the above mentioned channel utilization probability correction coefficient information by channel utilization probability information $P_i(t)$, so as to correct the channel utilization probability information $P_i(t)$. The channel utilization probability information $P_i'(t)$ after correction is determined by the following Equation (9).

[Equation 9]

$$p_i'(t) = C_{tx\_prob} p_i(t) \quad (9)$$

Because of this, if the channels are all utilized by any lower-level station, $C_{tx\_prob}=1$ is established, and the channel utilization probability information $P_i'(t)$ after correction and the channel utilization probability information $P_i(t)$ become a same value, therefore the correction is not actually performed.

If a channel which is not utilized exists, on the other hand, $C_{tx\_prob}>1$ is established, so correction is performed so that the channel utilization probability information $P_i'(t)$ after correction becomes a value greater than the channel utilization probability information $P_i$ (t).

In the adjustment unit 26C, adjustment processing according to the following Equation (10) is performed, where $P_{Max}$ is the maximum value in the range of the size of the channel utilization probability information and $P_{Min}$ is the minimum value in the range of the size of the channel utilization probability information.

[Equation 10]

$$p_i(t)=\max(P_{Min},\min(P_{Max},(p_i(t-1)+ \varDelta P_i))) \quad (10)$$

Here, 'max' is an operation to select a maximum value and 'min' is an operation to select a minimum value, and both $P_{Max}$ and $P_{Min}$ are equal to or more than 0 and are equal to or less than 1. If a relationship of gain and channel utilization probability is known in advance, appropriate values can be calculated based on this relationship. In this way, a channel utilization probability information $P_i$ (t) in the next transmission can be derived.

Figure 6:
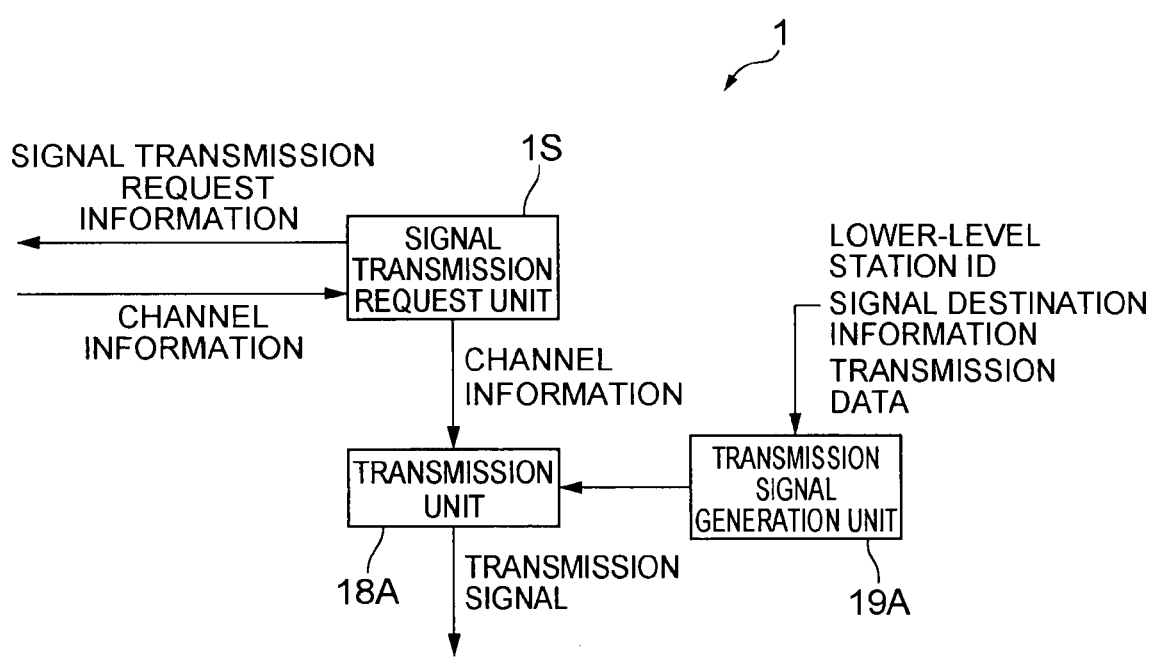
FIG. 6 is a block diagram depicting a lower-level station according to the second embodiment.

Now the configuration of the lower-level station 1 will be described with reference to FIG. 6. As FIG. 6 shows, the lower-level station 1 has: a signal transmission request unit 1S which transmits signal transmission request information to the middle-level station 2 and acquires information on a communication channel to be utilized for communication of the lower-level station 1 from the middle-level station 2; a transmission signal generation unit 19A which generates a transmission signal based on lower-level station ID information on the lower-level station 1, signal destination information which indicates a transmission destination, and transmission data to be transmitted; and a transmission unit 18A which transmits the transmission signal generated by the transmission signal generation unit 19 via the communication channel indicated in the communication channel information acquired by the signal transmission request unit 1S.

As FIG. 11 shows, the hardware of the middle-level station 2 or lower-level station 1 having the above mentioned functions is comprised of, for example: a CPU 101 which executes an operating system and application programs; a main storage unit 102 such as ROM and RAM; an auxiliary storage unit 103 such as memory; a communication control unit 104 which controls communication in general; a display unit 105 such as a liquid crystal monitor; and operation unit 106 having a keyboard to input characters and numbers and to instruct execution. Each function described with reference to FIG. 5 and FIG. 6 is implemented by having the CPU 101 and the main storage unit 102 shown in FIG. 11 read predetermined software, and by having a communication control unit 104 operate under control of the CPU 101, and also by having the main storage unit 102 and the auxiliary storage unit 103 read and write data.

[Operation in Radio Communication System of Second Embodiment]

Operation in the radio communication system of the second embodiment will now be described with reference to FIG. 7.

Figure 7:
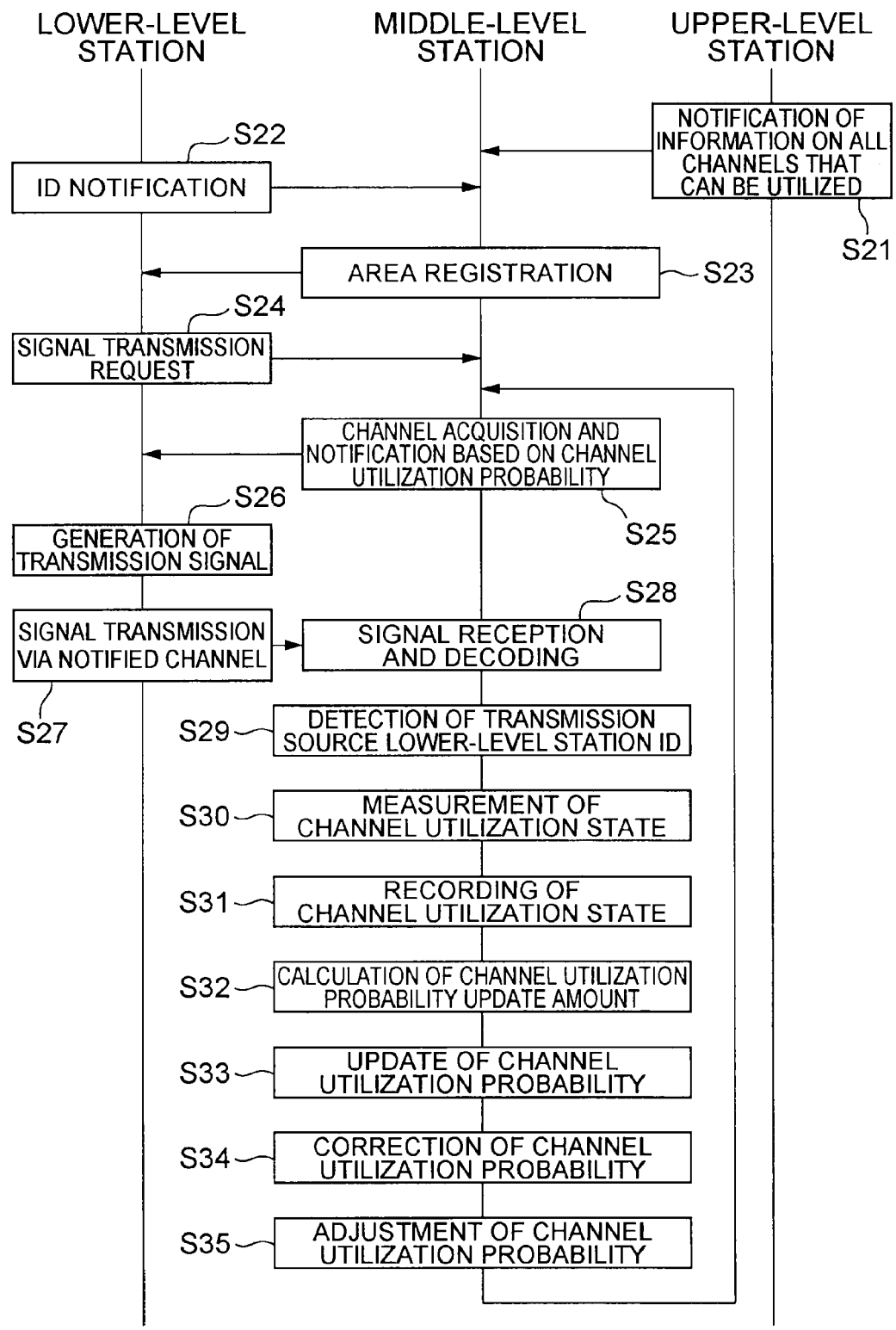
FIG. 7 is a flow chart depicting the operation in the radio communication system of the second embodiment.

An upper-level station 3 notifies information on all the channels that can be utilized under a middle-level station 2, to the middle-level station 2 in advance (step S21 in FIG. 7). The information on all the channels that can be utilized, which is notified from the upper-level station 3, may be recorded in the recording unit 24.

A lower-level station 1 transmits lower-level ID information which is unique to the lower-level station 1 to the middle-level station 2, in order to notify the existence of the lower-level station 1 to the middle-level station 2 (step S22). When this lower-level station ID information is received, the middle-level station 2 performs area registration of this lower-level station 1 based on the lower-level station ID information, and when the area registration completes, the middle-level station 2 notifies the registration completion notice and the above mentioned information on all the communication channels that can be utilized, to the lower-level station 1 (step S23).

When the signal transmission request unit 1S of the lower-level station 1 transmits signal transmission request information to the middle-level station 2 (step S24), the middle-level station 2 receives and decodes the signal transmission request information, then the channel determination unit 27 starts the operation to determine a channel to be utilized for the communication of the lower-level station 1, which transmitted the signal transmission request at a timing according to the channel utilization probability after the previous update by the utilization probability update unit 26 (step S25). The operation to determine a channel determination here corresponds to an operation to judge the current channel utilization state based on the channel utilization state information, and determine a channel based on this channel state. For example, in order to avoid collision communication, a signal in a channel is received and the reception intensity of this signal is measured, and it is judged whether the reception intensity is greater than a predetermined threshold, whereby it is judged whether another lower-level station utilizing this channel exists or not. In other words, if the reception intensity is greater than the predetermined threshold, it is judged that another lower-level station utilizing this channel exists, and if the reception intensity is less than the predetermined threshold, it is judged that another lower-level station utilizing this channel does not exist (this channel is not utilized). If it is judged that another lower-level station utilizing this channel does not exist (this channel is not utilized), the channel determination unit 27 determines to actually transmit this signal utilizing this channel. In this way, the channel determination unit 27 determines a channel, and notifies this channel information to the lower-level station 1.

In the lower-level station 1, when the transmission signal request unit 1S receives the channel information, the transmission signal generation unit 19A generates a transmission signal based on the lower-level station ID information of the lower-level station 1, signal destination information which indicates a transmission destination, and transmission data to be transmitted (step S26). Specifically, the transmission signal generation unit 19A generates a signal to be transmitted as a digital signal, and attaches the ID information of the middle-level station to be the destination of this signal and destination information of the receiver (lower-level station at the destination) to this digital signal as the signal destination information. For the destination information, an IP address of the receiver, for example, can be utilized. Then the transmission signal generation unit 19A can generate the transmission signal by attaching the lower-level station ID information of the lower-level station, which is a transmission source.

Then the transmission unit 18A transmits the generated transmission signal utilizing the notified communication channel (step S27).

In the middle-level station 2, on the other hand, the decoding unit 20 acquires a received signal by receiving and decoding the transmission signal (step S28), and the lower-level station ID detection unit 21 detects the lower-level station 1 of the transmission source from the received signal (step S29).

Then the index generation unit 23 generates channel utilization state index information which indicates channel utilization state to be measured, and the measurement unit 22 measures the channel utilization state indicated by this channel utilization state index information based on the received signal (step S30). Here the channel generation unit 23 can generate the index utilization state index information which indicates the channel utilization time of the lower-level station, as the channel utilization state to be measured. The channel utilization state measured by the measurement unit 22 is output to the recording unit 24 and channel determination unit 27 as the channel utilization state information.

The recording unit 24 associates a lower-level station ID of the lower-level station 1 detected by the lower-level station ID detection unit 21 and the channel utilization state of this lower-level station 1 measured by the measurement unit 22, and records these data in the embedded database (step S31). The recording unit 24 periodically initializes the database using predetermined database update period information, or updates the database using the latest information from a previous database update period, and after the recording in step S31, the recording unit 24 outputs the lower-level station count information which indicates a number of lower-level stations which have performed communication during the database update period and the channel utilization state recording information which indicates the channel utilization state of the lower-level stations which have performed this communication, to the correction unit 26B.

The update amount calculation unit 25 calculates the update amount of the channel utilization probability, as described above, based on the lower-level station count information and the channel utilization state recording information which are output from the recording unit 24, and the reaction coefficient information (step S32).

In the utilization probability update unit 26, the addition unit 26A updates the channel utilization probability by adding the update amount calculated by the update amount calculation unit 25 and the channel utilization probability after the previous update (step S33).

Then the correction unit 26B corrects the channel utilization probability updated by the addition unit 26A, based on the lower-level station count information, channel utilization state recording information, and information on all the communication channels that can be utilized (step S34).

Then the adjustment unit 26C adjusts the channel utilization probability after the correction by the correction unit 26B, as mentioned above, so that the channel utilization probability after the correction falls within a predetermined range (step S35). The channel utilization probability information after adjustment is output from the adjustment unit 26C to the channel determination unit 27, and is held by the channel determination unit 27, and is utilized when the processing in step S25 is performed the next time.

According to the second embodiment, the channel utilization probability is corrected by the correction unit 26B which is newly disposed in the middle-level station 2, based on the lower-level station count information, channel utilization state recording information, and information on all the communication channels that can be utilized, thereby in a state where the channel capacity is not being utilized at the maximum, the gains among the lower-level stations can be impartially allocated, and at the same time, an unnecessary drop of gains in the lower-level stations can be prevented, and the gain in the lower-level stations can be maximized.

Third Embodiment

A difference of the third embodiment from the first embodiment is that the correction unit 16B of the lower-level station 1 of the first embodiment corrects the channel utilization probability based on not only the lower-level station count information, channel utilization state recording information and information on all the communication channels that can be utilized, but also the latter mentioned channel collision state information.

In the first embodiment, the channel utilization probability information is corrected based on the assumption that the channel utilization probability can be increased when the gain of each lower level station is balanced at a relatively small value. The third embodiment, on the other hand, is an embodiment to handle a state when the gain of each lower-level station is low because of signal collision, although the channel utilization probability is sufficiently high.

Figure 8:
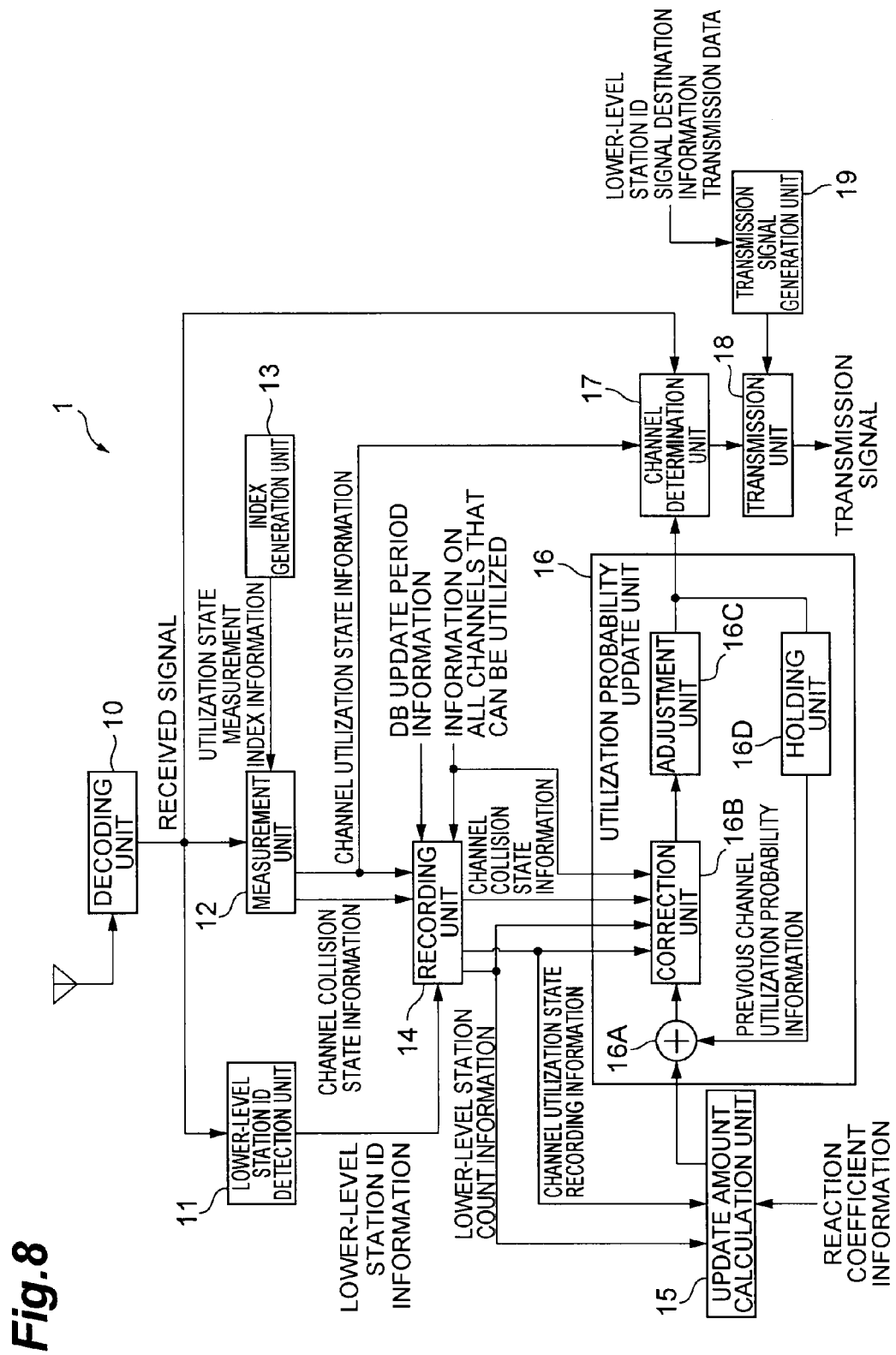
FIG. 8 is a block diagram depicting a lower-level station according to the third embodiment.

As FIG. 8 shows, in the configuration of the lower-level station 1 of the third embodiment, the measurement unit 12 measures the collision state of transmission signals, and outputs the measurement result as channel collision state information. The recording unit 14 records and outputs the channel collision state information, and the correction unit 16B corrects the channel utilization probability updated by the addition unit 16A, based on the lower-level station count information, channel utilization state recording information, information on all the communication channels that can be utilized, and channel collision state information.

Figure 9:
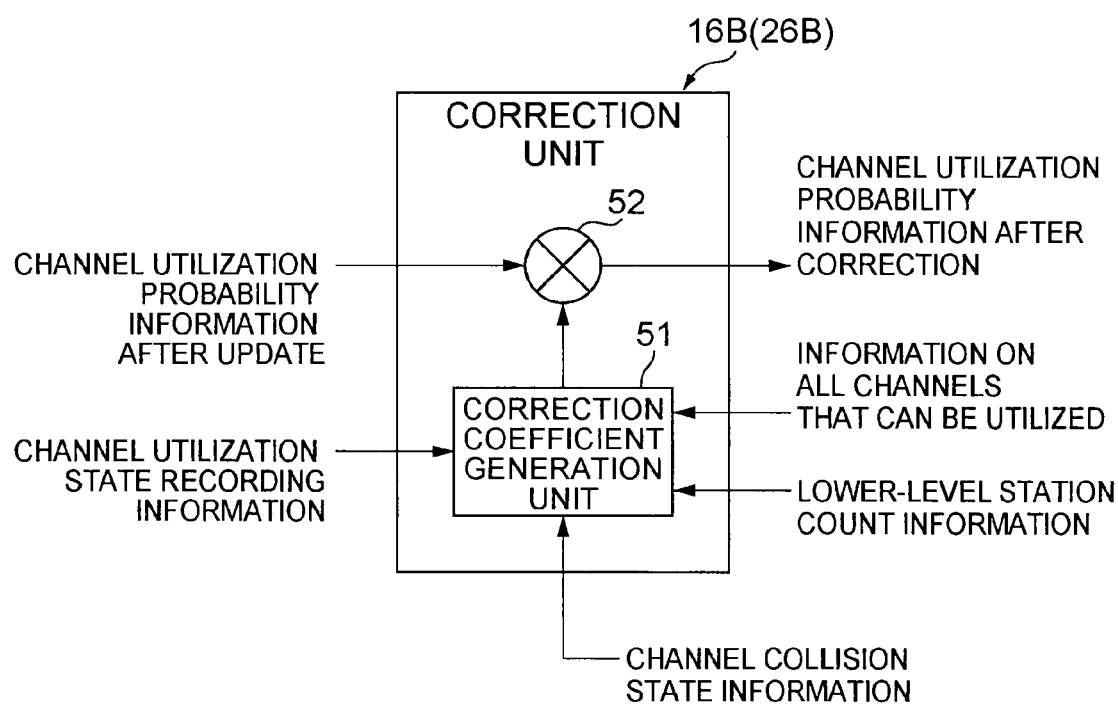
FIG. 9 is a block diagram depicting a correction unit according to the third embodiment.

As FIG. 9 shows, a correction coefficient generation unit 51 of the correction unit 16B generates and outputs channel utilization probability correction coefficient information $C_{tx\_prob}$ using not only the lower-level station count information, channel utilization state recording information and information on all the communication channels that can be utilized, but also the channel collision state information. The generation (calculation in this case) of the channel utilization probability correction coefficient information $C_{tx\_prob}$ will now be described.

In the calculation of the channel utilization probability correction coefficient information $C_{tx\_prob}$, $C_{tx\_prob}$ is determined by the following Equation (11), where $C_i$ is a weight coefficient of the i-th lower-level station.

[Equation 11]

$$C_{tx\_prob} = \frac{C_i Capa_{all}}{\sum_i x_{est\_i}} \quad (11)$$

$C_i$ is set such that the channel utilization probability decreases if actual gain is lower than the estimated gain information because of collision of the transmission signal of the relevant lower-level station and transmission signal of another lower-level station, for example. Since this state may be caused by setting the channel utilization probability too high, the channel utilization probability must be decreased according to the gain amount that is wasted due to the collision of signals. If the gain amount that is wasted by the collision of signals is $Capa_{collision}$, then $C_i$ can be set as shown in the following Equation (12), for example.

[Equation 12]

$$C_i = \frac{Capa_{all} - Capa_{collision}}{Capa_{all}} \quad (12)$$

$C_{tx\_prob}$ can also be designed by balancing the loss of gain due to the collision of signals and the loss of gain due to not utilizing the channel. If the loss of gain due to not utilizing the channel is $Capa_{blank}$, then $C_{tx\_prob}$ can be designed by the following Equation (13). Here γ is a reduction coefficient of the signal collision amount with respect to the unutilized channel amount, and is set so that no lower-level station stops signal transmission by an excessive decrease of signal collision.

[Equation 13]

$$C_{tx\_prob} = \frac{Capa_{all} - \gamma Capa_{collision}}{Capa_{all} - Capa_{blank}} \quad (13)$$

According to the third embodiment, the lower-level station 1 performs channel utilization probability information control considering the signal collision state, whereby more accurate channel utilization probability control can be implemented.

Figure 10:
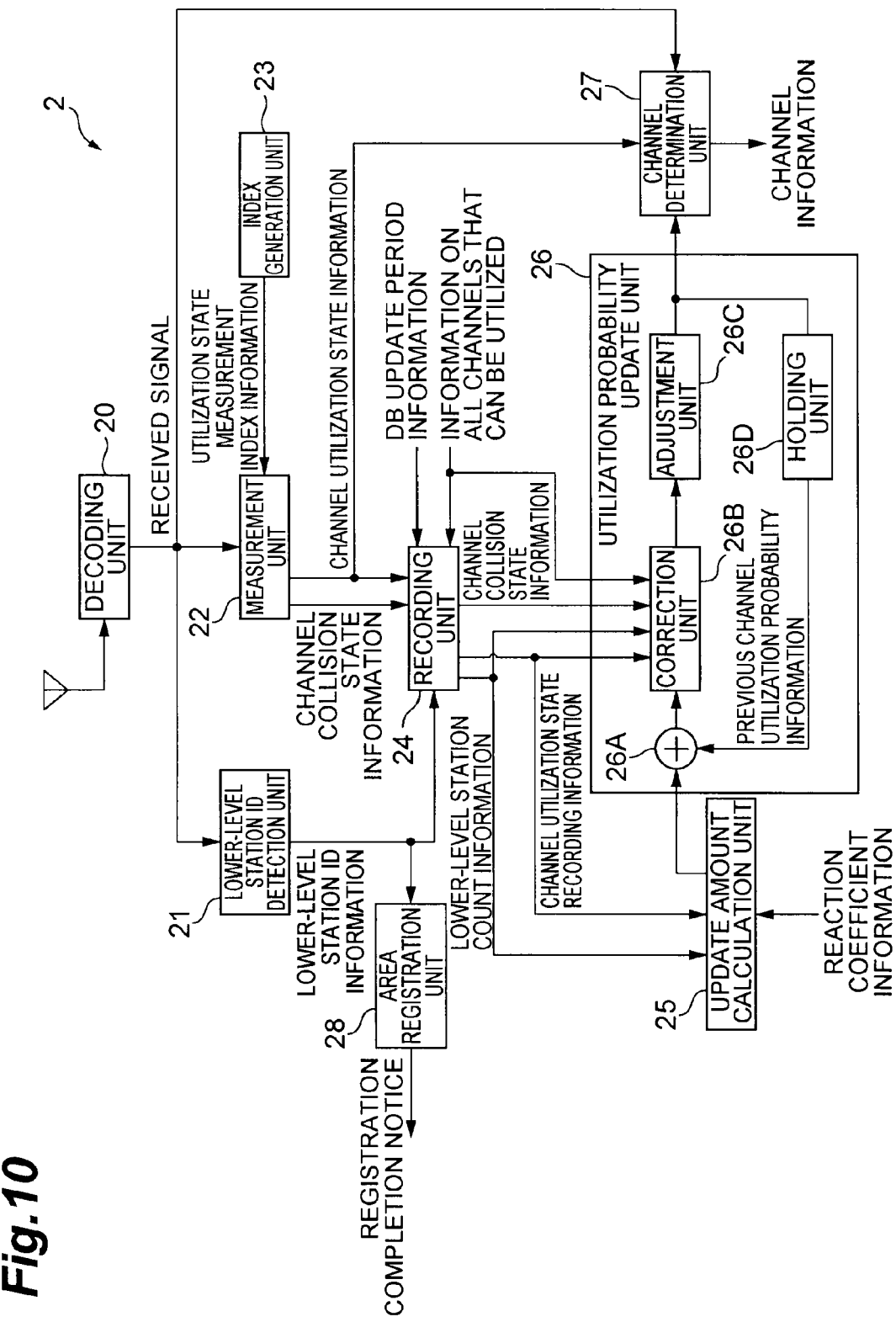
FIG. 10 is a block diagram depicting a middle-level station according to a variant form of the third embodiment.

The correction unit 26B of the middle-level station 2 of the second embodiment may be configured to correct the channel utilization probability based on not only the lower-level station count information, channel utilization state recording information and information on all the communication channels that can be utilized, but also the channel collision state information. In this case, as shown in FIG. 10, the measurement unit 22 of the middle-level station 2 may be configured to further measure the collision state of the transmission signals, and output the measurement result as channel collision state information, and the recording unit 24 records and also outputs channel collision state information, and the correction unit 26B corrects the channel utilization probability updated by the addition unit 26A based on the lower-level station information, channel utilization state recording information, information on all the communication channels that can be utilized, and the channel collision information. The configuration of the correction coefficient generation unit 51 of the correction unit 26B is the same as that shown in FIG. 9.

In this case as well, more accurate channel utilization probability control can be performed by the middle-level station 2 controlling the channel utilization probability information, considering the signal collision state.

Fourth Embodiment

A difference of the fourth embodiment is that the utilization state measurement index information is generated using the channel utilization time and bandwidth in use of the lower-level station, whereas the utilization state measurement index information is defined as the "time when the lower-level station utilized the communication time" in the first and second embodiments.

Combinations of all the required communication time and the bandwidth to be utilized has an infinite variety, depending on the characteristics of the applications utilized by each lower-level station. For example, one lower-level station may want to continue transmission for a long time using a relatively narrow bandwidth, such as a case of voice calls, and another lower-level station may want to transmit signals in a relatively short time using a wide bandwidth, such as a case of a large capacity data transfer.

In order to ensure impartiality among lower-level stations under such an environment, it is preferable that index generation unit 13 of the lower-level stations 1, or index generation unit 23 of the middle-level station 2, are regarded as a measurement target, for example, and the channel utilization state index information, which indicates the product of the channel utilization time and bandwidth in use of the lower-level station is generated as the channel utilization state to be measured.

Fifth Embodiment

A difference of the fifth embodiment is that the utilization state measurement index information is generated using a value corresponding to the signal reaching range, channel utilization time of the lower-level station and bandwidth in use, while in the first and second embodiments, the utilization state measurement index information is defined as the "time when the lower-level station utilized the communication channel".

When each lower-level station utilizes a different communication system, transmission output power may differ among the lower-level stations, because of the influence of the radio system and station disposition design. In such a case, if a lower-level station having a relatively high transmission output power transmits signals, other lower-level stations having a relatively low transmission output power may not be able to utilize the channels utilized for the transmission throughout a relatively wide range.

In order to ensure impartiality among lower-level stations in such an environment, it is preferable that the index generation unit 13 of the lower-level station 1 or the index generation unit 23 of the middle-level station 2 is configured to generate a channel utilization state index information which indicates a product of a value corresponding to a signal reaching range (e.g. index value which indicates the value of the signal reaching range, which is defined according to the signal reaching range) and the channel utilization time and bandwidth in use of the lower-level station, as a channel utilization state to be measured.

EFFECT OF THE PRESENT INVENTION

In order to evaluate the improvement effect of the present invention, the gain of each lower-level station according to a conventional method and the gain of each lower-level station according to the present invention, are compared by computer simulation. The simulation parameters are as follows.

Two lower-level stations, one middle-level station and one upper-level station, are assumed.

The initial value of the transmission probability of the lower-level station is 1.

The transmission packet length is the same for both lower-level stations, and the transmission timing is based on slots.

Operation in each lower-level station shows ideal values, where it is assumed that control errors and delays that are insignificant enough to be ignored.

Figure 12:
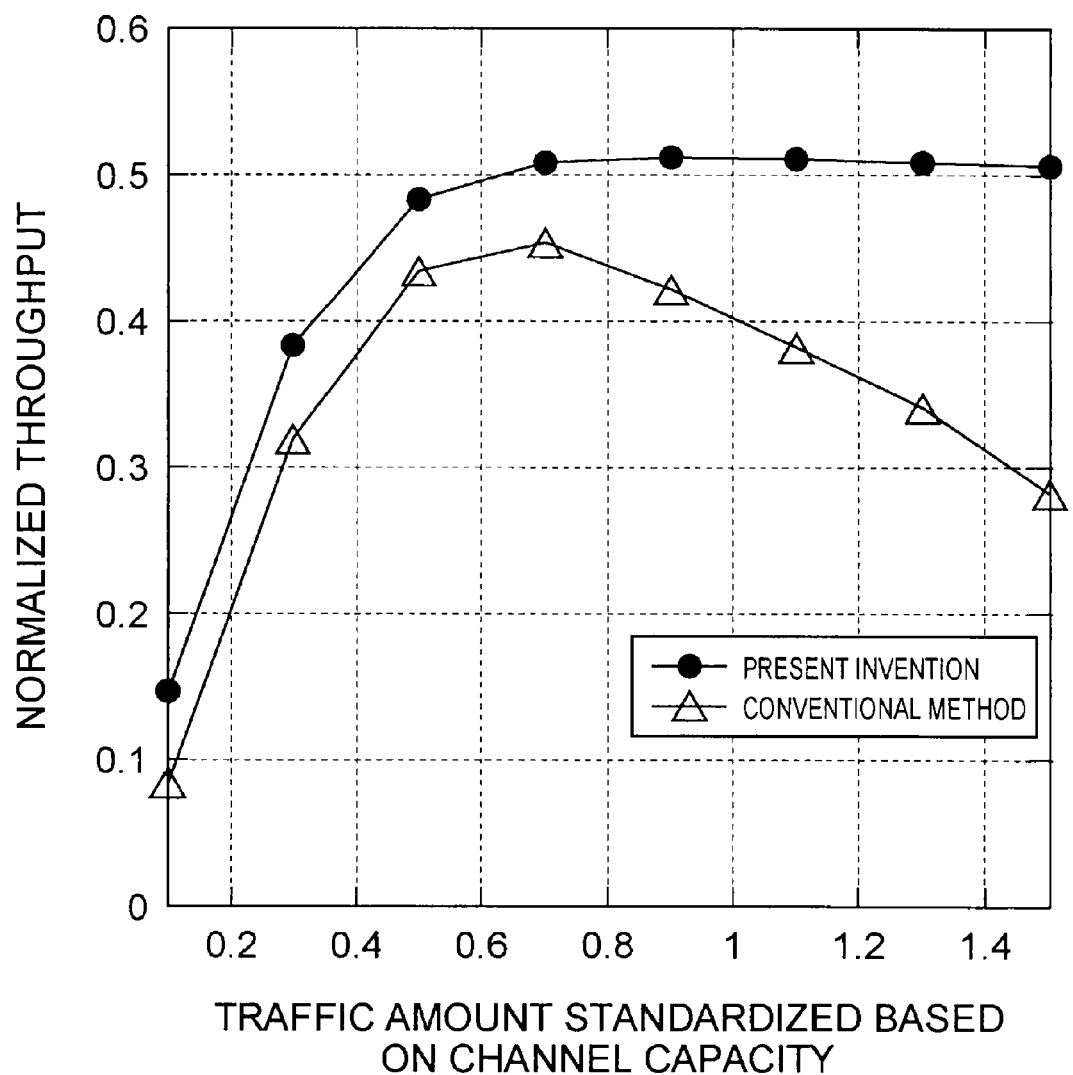
FIG. 12 is a graph showing the effect of the present invention.

FIG. 12 shows the simulation result. As FIG. 12 shows, the present invention can improve the total throughput by correcting the transmission probability of each lower-level station to be slightly higher in an environment where many channels are not utilized, with the applied traffic amount less than 1.0. In an environment where the applied traffic amount is 1.0 or more, the frequency of signal collision increases as the applied traffic amount increases, and the total throughput characteristics deteriorate in the case of the conventional method, which does not consider the signal collision amount. In the case of the present invention, however, which can control to decrease the transmission probability of each station considering the signal collision amount, the drop of total throughput can be prevented, even if the applied traffic amount increases.

The present invention was described in detail based on the embodiments. The present invention, however, is not limited to these embodiments. The present invention can be modified in various ways within a scope that does not deviate from the spirit thereof.

The invention claimed is:

1. A radio communication system, comprising an upper-level station, a plurality of middle-level stations and a plurality of lower-level stations, in which a unique lower-level station ID is assigned to each lower-level station, and a signal including information on the lower-level station ID can be transmitted/received between the lower-level stations, wherein the upper-level station is configured to notify the middle-level station of information on all the communication channels that can be utilized under the middle-level station, the middle-level station is configured to notify the lower-level station of the information on all the communication channels that can be utilized, the lower-level station comprises:

a decoding unit for receiving and decoding a signal which is transmitted from an other lower-level station to acquire a received signal;

a lower-level station ID detection unit for detecting a lower-level station ID of the other lower-level station from the received signal acquired by the decoding unit;

an index generation unit for generating channel utilization state index information which indicates a channel utilization state to be measured;

a measurement unit for measuring the channel utilization state indicated in the channel utilization state index information generated by the index generation unit, based on the received signal;

a recording unit for coupling and recording the lower-level station ID of the other lower-level station detected by the lower-level station ID detection unit and the channel utilization state of the other lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication;

an update amount calculation unit for calculating an update amount of a channel utilization probability which indicates a probability that a relevant lower-level station can utilize a predetermined channel, based on the lower-level station count information and channel utilization state recording information which are output from the recording unit and predetermined reaction coefficient information;

a utilization probability update unit for updating the channel utilization probability based on the lower-level station count information, the channel utilization state recording information, the information on all the communication channels that can be utilized which is notified by the middle-level station, and the update amount calculated by the update amount calculation unit;

a channel determination unit for determining, at a timing according to the channel utilization probability after update by the utilization probability update unit, a current channel state based on the received signal, and for determining a communication channel to be utilized for communication of the relevant lower-level station based on the current channel state;

a transmission signal generation unit for generating a transmission signal based on lower-level station ID information of the relevant lower-level station, signal destination information which indicates a transmission destination and transmission data to be transmitted; and a transmission unit for transmitting the transmission signal generated by the transmission signal generation unit via the communication channel determined by the channel determination unit, and the utilization probability update unit comprises:

an update unit for updating the channel utilization probability after the previous update, based on the update amount calculated by the update amount calculation unit;

a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

2. A lower-level station, to which a unique lower-level station ID is assigned and which can transmit/receive a signal including the lower-level station ID information to/from another lower-level station, comprising:

a decoding unit for receiving and decoding a signal which is transmitted from another lower-level station to acquire a received signal;

a lower-level station ID detection unit for detecting a lower-level station ID of the another lower-level station from the received signal acquired by the decoding unit;

an index generation unit for generating channel utilization state index information which indicates a channel utilization state to be measured;

a measurement unit for measuring the channel utilization state indicated in the channel utilization state index information generated by the index generation unit, based on the received signal;

a recording unit for coupling and recording the lower-level station ID of the another lower-level station detected by the lower-level station ID detection unit and the channel utilization state of the another lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication;

an update amount calculation unit for calculating an update amount of a channel utilization probability, which is a probability based on a relevant lower-level station determining whether a channel determination operation is started or not, based on lower-level station count information and channel utilization state recording information which are output from the recording unit and predetermined reaction coefficient information;

a utilization probability update unit for updating the channel utilization probability based on the lower-level station count information, the channel utilization state recording information, information on all the communication channels that can be utilized which is notified from an outside source, and the update amount calculated by the update amount calculation unit;

a channel determination unit for determining, at a timing according to the channel utilization probability after update by the utilization probability update unit, a current channel state based on the received signal, and for determining a communication channel to be utilized for communication of the relevant lower-level station based on the current channel state;

a transmission signal generation unit for generating a transmission signal based on lower-level station ID information of the relevant lower-level station, signal destination information which indicates a transmission destination, and transmission data to be transmitted; and a transmission unit for transmitting the transmission signal generated by the transmission signal generation unit via the communication channel determined by the channel determination unit, and wherein the utilization probability update unit comprises:

an update unit for updating the channel utilization probability after the previous update, based on the update amount calculated by the update amount calculation unit;

a correction unit for correcting the channel utilization probability updated by the update unit based on the lower-level station count information, the channel utilization state recording information and the information on all the communication channels that can be utilized; and an adjustment unit for adjusting the channel utilization probability after correction by the correction unit so that the channel utilization probability after the correction falls within a predetermined range.

3. The lower-level station according to claim 2, wherein the measurement unit is configured to further measure a collision state of transmission signals, and output the measurement result as channel collision state information, the recording unit is configured to further record and output the channel collision state information, and the correction unit is configured to correct the channel utilization probability updated by the update unit based on the lower-level station count information, the channel utilization state recording information, the information on all the communication channels that can be utilized, and the channel collision state information.

4. A radio communication system, comprising an upper-level station, a middle-level station, and a plurality of lower-level stations, in which a unique lower-level station ID is assigned to each lower-level station, and a signal including information on the lower-level station ID can be transmitted/received between the lower-level stations, wherein the upper-level station is configured to notify the middle-level station of information on all the communication channels that can be utilized under the middle-level station, the lower-level station comprises:

a signal transmission request unit for transmitting signal transmission request information to the middle-level station, and for acquiring information on a communication channel to be utilized for communication of a relevant lower-level station from the middle-level station;

a transmission signal generation unit for generating a transmission signal based on lower-level station ID information on the relevant lower-level station, signal destination information which indicates a transmission destination and transmission data to be transmitted; and a transmission unit for transmitting the transmission signal generated by the transmission signal generation unit via the communication channel indicated in the communication channel information acquired by the signal transmission request unit, the middle-level station comprises:

a decoding unit for receiving and decoding a signal which is transmitted from the lower-level station to acquire a received signal;

a lower-level station ID detection unit for detecting a lower-level station ID of the lower-level station from the received signal acquired by the decoding unit;

an index generation unit for generating channel utilization state index information which indicates a channel utilization state to be measured;

a measurement unit for measuring the channel utilization state indicated in the channel utilization state index information generated by the index generation unit, based on the received signal;

a recording unit for coupling and recording the lower-level station ID of the lower-level station detected by the lower-level station ID detection unit and the channel utilization state of the lower-level station measured by the measurement unit, and for outputting lower-level station count information which indicates a number of lower-level stations which have performed communication during a predetermined database update period and channel utilization state recording information which indicates the channel utilization state of lower-level stations which have performed communication;

an update amount calculation unit for calculating an update amount of a channel utilization probability, which is a probability based on which the relevant middle-level station determines whether a channel determination operation is started or not, based on the lower-level station count information and channel utilization state recording information which are output from the recording unit and predetermined reaction coefficient information;

a utilization probability update unit for updating the channel utilization probability based on the lower-level station count information, the channel utilization state recording information, the information on all the communication channels that can be utilized which is notified from the upper-level station, and the update amount calculated by the update amount calculation unit; and a channel determination unit for determining, at a timing according to the channel utilization probability after update by the utilization probability update unit, a current channel state based on the received signal, for determining a communication channel to be utilized for communication of the lower-level station based on the channel state, and for notifying the communication channel information to the lower-level station, and the utilization probability update unit comprises:

an update unit for updating the channel utilization probability after the previous update, based on the update amount calculated by the update amount calculation unit;

a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

5. A middle-level station which replies, upon receiving signal transmission request information from a lower-level station, communication channel information to be utilized for communication of the lower-level station, to which a unique lower-level station ID is assigned and which transmits a signal including information on the lower-level station ID, comprising:

a decoding unit for receiving and decoding a signal which is transmitted from the lower-level station to acquire a received signal;

a lower-level station ID detection unit for detecting a lower-level station ID of the lower-level station from the received signal acquired by the decoding unit;

an index generation unit for generating channel utilization state index information which indicates a channel utilization state to be measured;

a measurement unit for measuring the channel utilization state indicated in the channel utilization state index information generated by the index generation unit, based on the received signal;

a recording unit for coupling and recording the lower-level station ID of the lower-level station detected by the lower-level station ID detection unit and the channel utilization state of the lower-level station measured by the measurement unit, and for outputting lower-level station count information which indicates a number of lower-level stations which have performed communication during a predetermined database update period and channel utilization state recording information which indicates the channel utilization state of the lower-level stations which have performed communication;

an update amount calculation unit for calculating an update amount of a channel utilization probability, which is a probability based on a relevant middle-level station determining whether a channel determination operation is started or not, based on the lower-level station count information and channel utilization state recording information which are output from the recording unit and predetermined reaction coefficient information;

a utilization probability update unit for updating the channel utilization probability based on the lower-level station count information, the channel utilization state recording information, the information on all the communication channels that can be utilized which is notified from an outside source, and the update amount calculated by the update amount calculation unit; and a channel determination unit for determining, at a timing according to the channel utilization probability after update by the utilization probability update unit, a current channel state based on the received signal, for determining a communication channel to be utilized for communication of the lower-level station based on the channel state, and for notifying the communication channel information to the lower-level station, and wherein the utilization probability update unit comprises:

an update unit for updating the channel utilization probability after the previous update, based on the update amount calculated by the update amount calculation unit;

a correction unit for correcting the channel utilization probability updated by the update unit based on the lower-level station count information, the channel utilization state recording information, and the information on all the communication channels that can be utilized; and an adjustment unit for adjusting the channel utilization probability after correction by the correction unit so that the channel utilization probability after the correction falls within a predetermined range.

6. The middle-level station according to claim 5, wherein the measurement unit is configured to further measure a collision state of transmission signals, and output the measurement result as channel collision state information, the recording unit is configured to further record and output the channel collision state information, and the correction unit is configured to correct the channel utilization probability updated by the update unit based on the lower-level station count information, the channel utilization state recording information, the information on all the communication channels that can be utilized, and the channel collision state information.

7. The radio communication system according to claim 1, wherein the index generation unit is configured to generate the channel utilization state index information which indicates a channel utilization time of the lower-level station as the channel utilization state to be measured.

8. The radio communication system according to claim 1, wherein the index generation unit is configured to generate the channel utilization state index information which indicates a product of a channel utilization time of the lower-level station multiplied by a bandwidth in use of the lower-level station, as the channel utilization state to be measured.

9. The radio communication system according to claim 1, wherein the index generation unit is configured to generate the channel utilization state index information which indicates a product of a value corresponding to a signal reaching range multiplied by a channel utilization time and a bandwidth in use of the lower-level station, as the channel utilization state to be measured.

10. The radio communication system according to claim 4, wherein the index generation unit is configured to generate the channel utilization state index information which indicates a channel utilization time of the lower-level station, as the channel utilization state to be measured.

11. The radio communication system according to claim 4, wherein the index generation unit is configured to generate the channel utilization state index information which indicates a product of a channel utilization time of the lower-level station multiplied by a bandwidth in use of the lower-level station, as the channel utilization state to be measured.

12. The radio communication system according to claim 4, wherein the index generation unit is configured to generate the channel utilization state index information which indicates a product of a value corresponding to a signal reaching range multiplied by a channel utilization time and a bandwidth in use of the lower-level station, as the channel utilization state to be measured.

* * * * *